(12) United States Patent
Hara et al.

(10) Patent No.: US 11,451,179 B2
(45) Date of Patent: Sep. 20, 2022

(54) MOTOR CONTROL DEVICE AND BRAKE CONTROL DEVICE

(71) Applicant: Hitachi Automotive Systems, Ltd., Hitachinaka (JP)

(72) Inventors: Takafumi Hara, Tokyo (JP); Toshiyuki Ajima, Tokyo (JP); Shigehisa Aoyagi, Tokyo (JP); Hiroyuki Ota, Hitachinaka (JP); Kenichiro Matsubara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 312 days.

(21) Appl. No.: 16/755,259

(22) PCT Filed: Oct. 10, 2018

(86) PCT No.: PCT/JP2018/037749
§ 371 (c)(1),
(2) Date: Apr. 10, 2020

(87) PCT Pub. No.: WO2019/087721
PCT Pub. Date: May 9, 2019

(65) Prior Publication Data
US 2020/0244203 A1    Jul. 30, 2020

(30) Foreign Application Priority Data
Oct. 31, 2017    (JP) .............................. JP2017-210130

(51) Int. Cl.
*H02P 23/14*    (2006.01)
*F16D 55/225*    (2006.01)
(Continued)

(52) U.S. Cl.
CPC ............ *H02P 23/14* (2013.01); *F16D 55/225* (2013.01); *F16D 65/183* (2013.01);
(Continued)

(58) Field of Classification Search
CPC .. H02P 21/00; H02P 21/0017; H02P 21/0021; H02P 21/0089; H02P 21/04;
(Continued)

(56) References Cited

U.S. PATENT DOCUMENTS

2009/0200971 A1    8/2009    Iwaji et al.
2010/0066284 A1*   3/2010    Iwaji .................. H02P 21/04
                                                      318/400.02

(Continued)

FOREIGN PATENT DOCUMENTS

JP        7-245981 A      9/1995
JP     2009-189176 A      8/2009
(Continued)

OTHER PUBLICATIONS

Korean-language Office Action issued in Korean Application No. 10-2020-7010833 dated Jul. 8, 2021 with English translation (20 pages).
(Continued)

*Primary Examiner* — Antony M Paul
(74) *Attorney, Agent, or Firm* — Crowell & Moring LLP

(57) ABSTRACT

Disclosed are a motor control device that can accurately estimate a rotor position based on a neutral point potential even when a load increases, and a brake control device that is driven by the motor control device. The motor control device 3 includes a three-phase synchronous motor 4 including a three-phase winding, an inverter 31 connected to the three-phase winding, a control unit 6 for controlling the inverter based on a rotor position of the three-phase synchronous motor, and a rotational position estimation unit 2 for estimating a rotor position θd based on a neutral point potential Vn of the three-phase winding. The rotational position estimation unit estimates a rotor position selectively using one or more of a plurality of detected values of the
(Continued)

neutral point potential according to a pre-estimated value of the rotor position and a voltage application state to the three-phase winding.

15 Claims, 14 Drawing Sheets

(51) Int. Cl.
  *F16D 65/18* (2006.01)
  *H02P 25/022* (2016.01)
  *H02P 27/08* (2006.01)
  *B60T 1/06* (2006.01)
  *B60T 13/66* (2006.01)
  *B60T 13/74* (2006.01)

(52) U.S. Cl.
  CPC .......... *H02P 25/022* (2013.01); *H02P 27/08* (2013.01); *B60T 1/065* (2013.01); *B60T 13/66* (2013.01); *B60T 13/741* (2013.01)

(58) Field of Classification Search
  CPC .......... H02P 21/14; H02P 21/18; H02P 21/22; H02P 21/24; H02P 23/00; H02P 23/03; H02P 23/14; H02P 25/026; H02P 25/064; H02P 25/089; H02P 27/00; H02P 27/04; H02P 27/06; H02P 27/08; H02P 27/085; H02P 29/0022; H02P 1/00; H02P 1/04; H02P 1/24; H02P 1/26; H02P 3/06; H02P 3/26; H02P 3/22; H02P 1/46; H02P 1/42; B60T 1/065
  See application file for complete search history.

(56) References Cited

U.S. PATENT DOCUMENTS

| | | |
|---|---|---|
| 2011/0043146 A1 | 2/2011 | Sato |
| 2014/0077738 A1 | 3/2014 | Iwaji et al. |
| 2017/0194889 A1 | 7/2017 | Iwaji et al. |
| 2017/0261246 A1 | 9/2017 | Park et al. |
| 2018/0183366 A1 | 6/2018 | Hara et al. |

FOREIGN PATENT DOCUMENTS

| | | |
|---|---|---|
| JP | 2010-22196 A | 1/2010 |
| JP | 2010-74898 A | 4/2010 |
| JP | 2013-252861 A | 12/2013 |
| JP | 2014-217191 A | 11/2014 |
| JP | 5697745 B2 | 4/2015 |
| JP | 2017-17910 A | 1/2017 |
| WO | WO 2012/157039 A1 | 11/2012 |
| WO | WO 2015/182352 A1 | 12/2015 |

OTHER PUBLICATIONS

International Search Report (PCT/ISA/210) issued in PCT Application No. PCT/JP2018/037749 dated Jan. 8, 2019 with English translation (five (5) pages).

Japanese-language Written Opinion (PCT/ISA/237) issued in PCT Application No. PCT/JP2018/037749 dated Jan. 8, 2019 (four (4) pages).

\* cited by examiner

CONFIGURATION OF BRAKE CONTROL DEVICE (ELECTRIC DISK BRAKE)
ATTACHED TO ONE VEHICLE WHEEL

| VOLTAGE VECTOR | NAME OF Vn0 (DETECTION VALUE) |
|---|---|
| V(1,0,0) | VnA |
| V(1,0,1) | VnB |
| V(0,0,1) | VnC |
| V(0,1,1) | VnD |
| V(0,1,0) | VnE |
| V(1,1,0) | VnF |

$$Vn0 = \left[\frac{Lv}{Lu//Lw + Lv} - (2/3)\right] \times VDC$$

$$Vn0 = \left[\frac{Lu//Lv}{Lu//Lv + Lw} - (1/3)\right] \times VDC$$

MOTOR CONTROL DEVICE AND BRAKE CONTROL DEVICE

TECHNICAL FIELD

The present invention relates to a motor control device and a brake control device that is driven by the motor control device.

BACKGROUND ART

In a brake control device used for an automobile or the like, a permanent magnet synchronous motor, which is a small-sized and high-efficiency three-phase synchronous motor, is used. In general, a permanent magnet synchronous motor detects the rotational position of a rotor having a magnet with a magnetic detection element such as a Hall IC, and based on the detection result, sequentially excites an armature coil on a stator side to rotate the rotor. In addition, by using resolvers, encoders, and GMR sensors (Giant Magneto Resistivity effect), which are precise rotational position detectors, driving with sinusoidal current can be realized, and vibration and noise such as torque ripples are reduced.

When the rotational position detector fails, the three-phase synchronous motor cannot rotate immediately. The same applies to a case where a resolver, an encoder, or a GMR sensor other than the Hall IC is used for the rotational position detector. As described above, the failure of the rotational position detector causes stopping the brake boosting in the brake control device, which is an important safety component, so as to reduce the braking force of the vehicle, and causes abnormal driving.

On the other hand, a conventional technique described in PTL 1 is known.

In the technique described in PTL 1, when a rotational position detector fails, a rotational position estimation unit that estimates a position from an induced voltage and a current induced by a rotor magnetic flux is used as an alternative to the rotational position detector. Thus, the three-phase synchronous motor can be driven stably even when the rotational position detector fails. However, this rotational position estimation unit is difficult to estimate the position of the rotor at a low speed because the induced voltage is buried in noise when the rotational speed of the three-phase synchronous motor is low. In particular, in the brake control device that boosts the driver's depression force with a three-phase synchronous motor, the rotational speed of the three-phase synchronous motor used to tighten a caliper is used at zero speed or at a low speed near zero speed. PTL 1 cannot estimate the position of the rotor.

Here, it is considered that a plurality of rotational position detectors may be provided redundantly without using the rotational position estimation unit based on the induced voltage. However, in the brake control device, it is difficult to increase the number of hardware-based rotational position detectors due to mounting space and cost restrictions.

Therefore, conventional techniques described in PTLs 2 to 4 are known as a rotational position estimation unit for detecting the rotor position at zero speed and low speed with the same accuracy as before the failure of the rotation detector.

In the technique described in PTL 2, a high-frequency current is supplied to the permanent magnet synchronous motor, and a rotor position is detected from current harmonics generated at that time and a mathematical model of the permanent magnet synchronous motor. In this technique, the position can be detected by using the current harmonics generated by the saliency of the rotor of the permanent magnet synchronous motor.

The technology described in PTL 3 is based on a 120-degree energization method in which two phases are selected for energization from among three-phase stator windings of the permanent magnet synchronous motor, and the position of the rotor is detected based on an electromotive voltage (not an electromotive voltage according to a speed, but an electromotive voltage due to an imbalance in inductance) generated in a non-energized phase. In this technique, since the electromotive voltage generated according to the position is used, position information can be obtained even in a completely stopped state.

In the techniques described in PTL 4 and PTL 5, "neutral point potential" which is a potential at a connection point of a three-phase stator winding is detected to obtain position information. At that time, by detecting the neutral point potential in synchronization with the PWM (pulse width modulation) wave of an inverter, the electromotive voltage due to the imbalance in the inductance can be detected as in the technology of PTL 3, and as a result the position information of the rotor can be obtained. Further, according to the techniques of PTLs 4 and 5, it is possible to make the drive waveform an ideal sinusoidal current.

Among the techniques of PTLs 2 to 5, the techniques of PTLs 4 and 5 are useful as position detection unit when the rotation speed of a motor is low, which is one of the problems of the rotational position sensor-less control.

CITATION LIST

Patent Literature

PTL 1: JP 2010-022196 A
PTL 2: JP 7-245981 A
PTL 3: JP 2009-189176 A
PTL 4: JP 2010-74898 A
PTL 5: WO 2012/157039

SUMMARY OF INVENTION

Technical Problem

The one described in PTL 1 uses a software-based rotational position estimation unit for estimating a position with an induced voltage induced by rotation of a motor in place of a hardware-based rotational position detector when a rotational position detector fails. As a result, continuous driving required for the electrically controlled brake device and the electric power steering can be realized. However, it is difficult to estimate the position in the operation region of the three-phase synchronous motor frequently used in the electrically controlled brake device and the electric power steering.

Further, in the technologies of PTLs 2 to 4, although the rotational position accuracy at zero speed and low speed can be detected with the same accuracy as before the failure, there are the following problems.

In the technique of PTL 2, the rotor structure of the permanent magnet synchronous motor requires saliency. If there is no saliency or there is little saliency, the position detection sensitivity decreases, and it becomes difficult to estimate the position.

In order to detect with high sensitivity, it is necessary to increase the high frequency component to be injected or to lower the frequency. As a result, rotation pulsation, vibration, and noise increase, and harmonic loss of the permanent magnet synchronous motor increases.

In the technique of PTL 3, since an electromotive voltage generated in the non-energized phase of the three-phase winding is observed, the permanent magnet synchronous motor can be driven from a stopped state, but the drive current waveform conducts by 120 degrees (rectangular wave). Originally, it is more advantageous to drive a permanent magnet synchronous motor with a sinusoidal current in terms of suppressing rotation unevenness and harmonic loss, but in the technology of PTL 3, it is difficult to drive a sinusoidal wave.

In the techniques of PTLs 4 and 5, "neutral point potential" which is a potential at a connection point of a three-phase stator winding is detected to obtain position information. By detecting this neutral point potential in synchronization with the pulse voltage applied from an inverter to the motor, a potential change depending on the rotor position can be obtained. The position information can also be obtained by PWM (pulse width modulation) obtained by ordinary sine wave modulation as the voltage applied to the motor. However, the techniques of PTLs 4 and 5 have problems as described in detail below.

FIG. 1 illustrates a PWM waveform and a neutral point potential waveform according to the techniques of PTLs 4 and 5. The PWM pulse waveforms PVu, PVv, and PVw are generated by comparing the three-phase voltage commands Vu*, Vv*, and Vw* with the triangular wave carrier. Although the three-phase voltage commands Vu*, Vv*, and Vw* have sinusoidal waveforms, these can be regarded as having a sufficiently low frequency compared to the triangular wave carrier during low-speed driving. It can be actually regarded as DC as in FIG. 1.

PVu, PVv, and PVw, which are PWM pulse waves, are repeatedly turned on and off at different timings. The voltage vectors in the figure are named like V (0,0,1), but their suffixes (0,0,1) indicate the U, V, and W phase switch states, respectively. That is, V (0,0,1) indicates that the U phase has PVu=0, the V phase has PVv=0, and the W phase has PVw=1. Here, V (0,0,0) and V (1,1,1) are zero vectors in which the voltage applied to the motor becomes zero.

As illustrated in these waveforms, a normal PWM wave causes two types of voltage vectors V (0,0,1) and V (1,0,1) to be generated between a first zero vector V (0,0,0) and a second zero vector V (1,1,1). That is, the pattern of voltage vector transition "V (0,0,0)→V (0,0,1)→V (1,0,1)→V (1,1,1)→V (1,0,1)→V (0,0,1)→V (0,0,0)" is repeated as one cycle. The same voltage vector is used between the zero vectors as long as the magnitude relation of the three-phase voltage commands Vu*, Vv*, and Vw* does not change.

When a voltage other than the zero vector is applied, an electromotive voltage corresponding to the rotor position is generated at the neutral point potential. Utilizing this, the technique of PTL 4 estimates the rotor position.

However, there is a practical problem when the rotational position sensor-less control using the neutral point potential at zero speed or extremely low speed is applied to a motor control device that drives the brake control device. As an example, the brake control device (electric disk brake) for obtaining a braking force by directly tightening a caliper from a motor via a rotational linear-motion mechanism will be described.

FIG. 2 illustrates a schematic configuration and an operation pattern of the brake control device.

The brake control device (electric disk brake) is attached to one of the wheels, and drives the permanent magnet synchronous motor (M) based on a braking force command by a driver's depression force. Then, the torque in the rotational direction is converted into a thrust in the horizontal direction via the rotational linear-motion mechanism 61, and when a brake pad 62 of a caliper 7R is pressed against a brake disk 63, a pressing force is generated to cause a braking force.

As illustrated in FIG. 2, at time (A), a braking force command is given as a driver's depression force. At this time, a motor torque command is generated, and the motor rotates. When the motor rotates a certain amount, the brake pad 62 reaches the brake disk 63 at time (B).

In section (1) from time (B) to time (C), the brake disk 63 is tightened with a constant pressing force by the brake pad 62 in order to exert a constant braking force. At this time, the torque command is not 0, whereas the rotation speed of the motor is 0. Hereinafter, section (1) from the time (B) to the time (C) is referred to as a "clearance area".

From time (C) to time (D), the brake pad 62 separates from the brake disk 63.

As described above, in the brake control device, the time range in which the braking force is kept constant, that is, the time range in which the rotation speed is zero or low but the torque is generated is relatively long.

FIG. 3 illustrates a variation amount in the neutral point potential from the reference potential when the load torque is changed. Further, in FIG. 3, section (A) is divided into section (G) every 60 electrical angle.

At low load, sections (B), (C), and (D) show large changes in the neutral point potential with respect to the electrical angle, whereas sections (A), (E), (F), and (G) show small changes in the neutral point potential with respect to the electrical angle. At high load, sections (B) and (F) show large changes in the neutral point potential with respect to the electrical angle, whereas sections (A), (C), (D), (E), and (G) show small changes in the neutral point potential with respect to the electrical angle.

As illustrated in FIG. 3, the state of the change in the neutral point potential differs depending on the load condition. As the load increases, sections increase in which the amount of change in the neutral point potential does not become a value at which the rotor position can be accurately estimated. For this reason, the position estimation accuracy based on the neutral point potential decreases.

As described above, the motor control device that drives the brake control device is often driven so as to generate torque at a rotational speed of zero or at a low speed. In such a motor control device, a decrease in the estimation accuracy of the magnetic pole position of the motor causes instability of the braking force of the vehicle and extension of the braking distance.

Therefore, the invention provides a motor control device that can accurately estimate a rotor position based on a neutral point potential even when a load increases, and a brake control device that is driven by the motor control device.

Solution to Problem

In order to solve the above problems, a motor control device according to the invention includes a three-phase synchronous motor including a three-phase winding, an inverter connected to the three-phase winding, a control unit for controlling the inverter based on a rotor position of the three-phase synchronous motor, and a rotational position estimation unit for estimating a rotor position based on a neutral point potential of the three-phase winding. The rotational position estimation unit estimates a rotor position selectively using one or more of a plurality of detected values of the neutral point potential according to a pre-estimated value of the rotor position and a voltage application state to the three-phase winding.

In order to solve the above problems, a brake control device according to the invention includes a brake, and a motor control device that drives the brake. The motor control device includes a three-phase synchronous motor that includes a three-phase winding, an inverter that is connected to the three-phase winding, a control unit that controls the inverter based on a rotor position of the three-phase synchronous motor, and a rotational position estimation unit that estimates the rotor position based on a neutral point potential of the three-phase winding. The rotational position estimation unit estimates the rotor position selectively using one or more of a plurality of detected values of the neutral point potential according to a pre-estimated value of the rotor position and a voltage application state to the three-phase winding.

In order to solve the above problem, a motor control device according to the invention includes a three-phase synchronous motor that includes a three-phase winding, an inverter that is connected to the three-phase winding, and a control unit that controls the inverter based on a rotor position of the three-phase synchronous motor. The control unit controls the inverter based on the rotor position sensed by a plurality of rotational position detectors provided redundantly. Further, the motor control device includes a rotational position estimation unit that estimates the rotor position based on a neutral point potential of the three-phase winding, and a determination unit that determines abnormality of the plurality of rotational position detectors based on the rotor position estimated by the rotational position estimation unit. The rotational position estimation unit estimates the rotor position selectively using one or more of a plurality of detected values of the neutral point potential according to a pre-estimated value of the rotor position and a voltage application state to the three-phase winding.

Advantageous Effects of Invention

According to the invention, a rotor position can be accurately estimated regardless of a load. Thereby, the reliability of the motor control device and the brake control device using the same is improved.

Objects, configurations, and effects besides the above description will be apparent through the explanation on the following embodiments.

DESCRIPTION OF EMBODIMENTS

Figure 1:
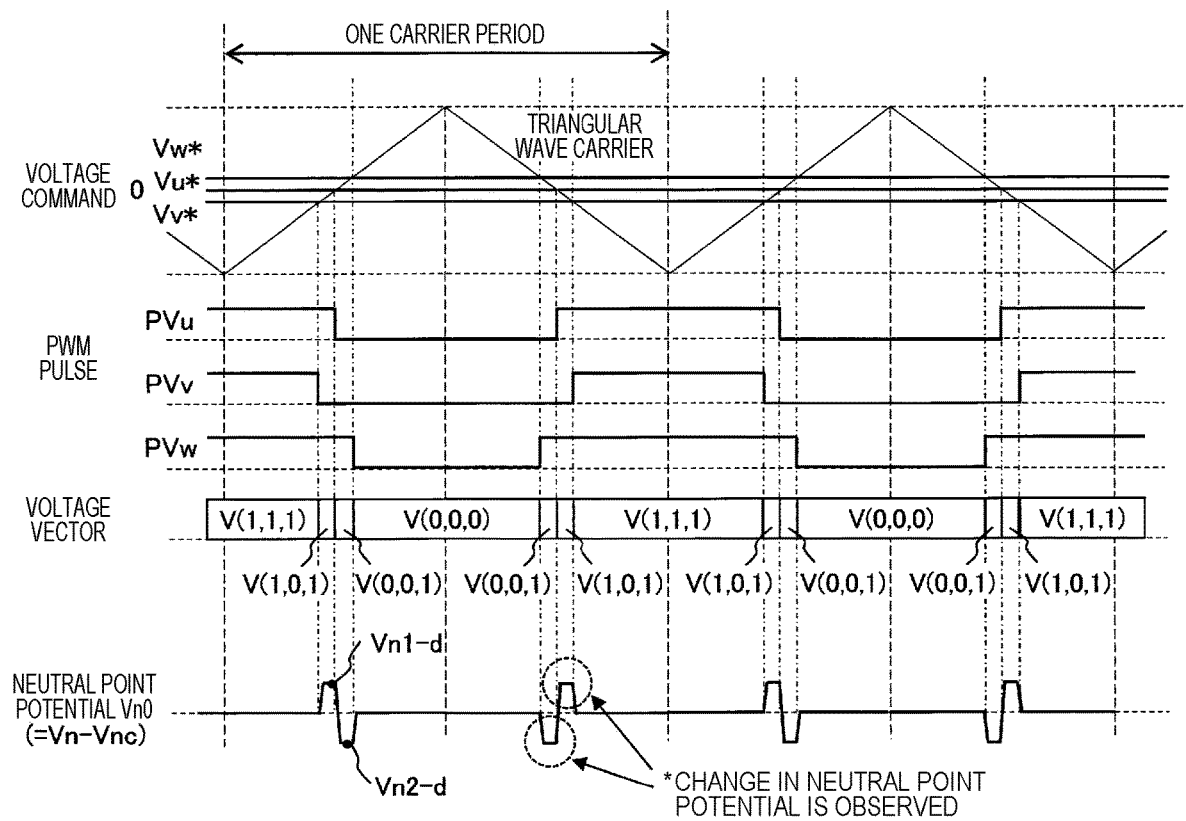
FIG. 1 illustrates a PWM waveform and a neutral point potential waveform according to the related art.

Hereinafter, embodiments of the invention will be described using the drawings. Further, the components attached with the same symbol in the drawings are the same components or the components having a similar function.

First Embodiment

Figure 4:
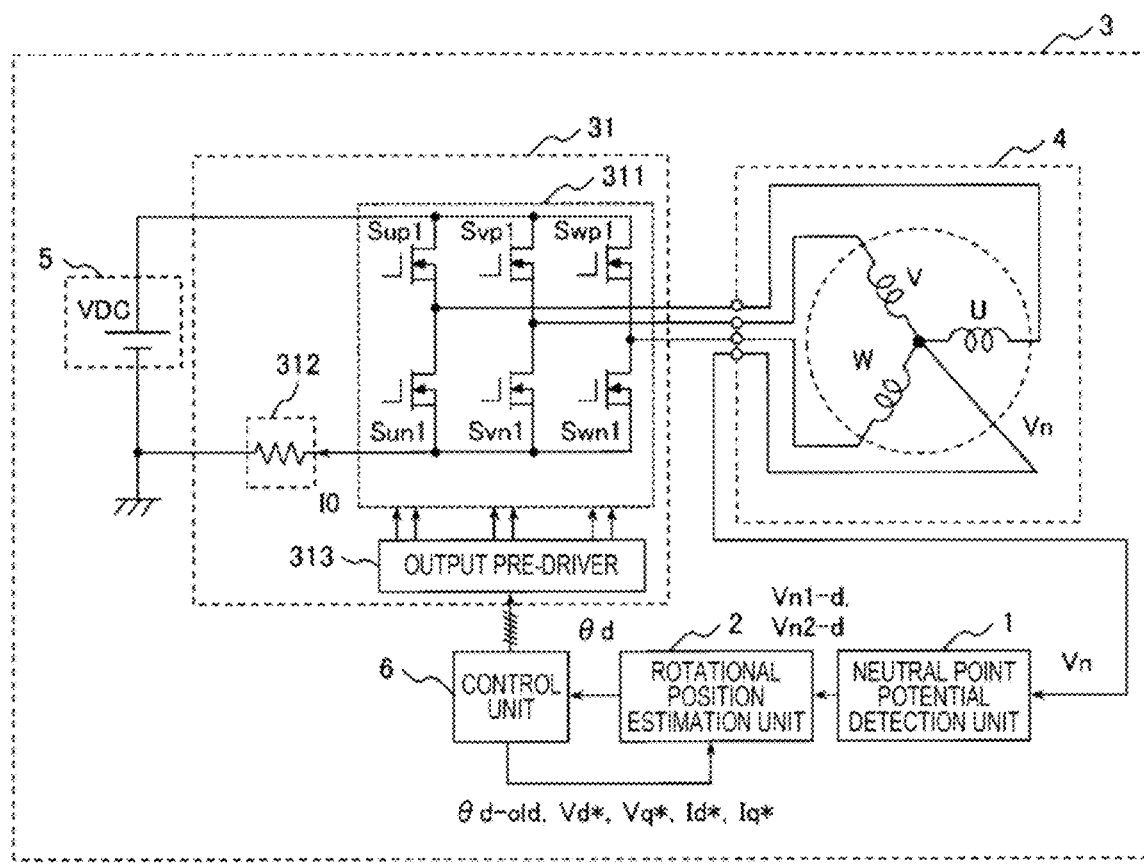
FIG. 4 is a block diagram illustrating a configuration of a motor control device according to a first embodiment.

FIG. 4 is a block diagram illustrating a configuration of a motor control device according to a first embodiment of the invention.

A motor control device 3 drives and controls a permanent magnet synchronous motor 4 as a three-phase synchronous motor.

The motor control device 3 includes a DC power source 5, an inverter 31 including an inverter main circuit 311 and a one-shunt current detector 312, and a permanent magnet synchronous motor 4 to be driven.

In the first embodiment, a MOSFET (Metal Oxide Semiconductor Field Effect Transistor) is applied as a semiconductor switching element included in the inverter main circuit 311. Further, the inverter 31 is of a voltage type, and generally a freewheeling diode is connected to a semiconductor switching element in antiparallel. In the first embodiment, since a built-in diode of the MOSFET is used as a freewheeling diode, the freewheeling diode is not illustrated in FIG. 4. Further, an IGBT (Insulated Gate Bipolar Transistor) or the like may be used instead of the MOSFET. Further, the freewheeling diode may be externally provided.

In this embodiment, one three-phase winding is driven by one inverter, but the invention is not limited thereto. A plurality of windings may be provided on the same stator, and these windings may be driven by a plurality of inverters.

The inverter 31 includes an output pre-driver 313 in addition to the inverter main circuit 311 and the one-shunt current detector 312.

The inverter main circuit 311 is a three-phase full bridge circuit composed of six semiconductor switching elements Sup1 to Swn1.

The one-shunt current detector 312 detects a supply current I0 (DC bus current) to the inverter main circuit 311.

The output pre-driver 313 is a driver circuit that directly drives the semiconductor switching elements Sup1 to Swn1 of the inverter main circuit 311.

The three-phase current flowing through the three-phase winding is measured by a so-called one-shunt method based on the DC bus current I0 detected by the one-shunt current detector 312. Since the one-shunt method is a known technique, a detailed description is omitted.

A DC power source 5 supplies DC power to the inverter 31.

A control unit 6 creates a gate command signal to be given to the output pre-driver 313 based on a rotor position θd estimated and calculated by a rotational position estimation unit 2 from neutral point potential detection values Vn1-d and Vn2-d detected by the neutral point potential detection unit 1 based on a neutral point potential Vn sensed in the three-phase winding.

Figure 5:
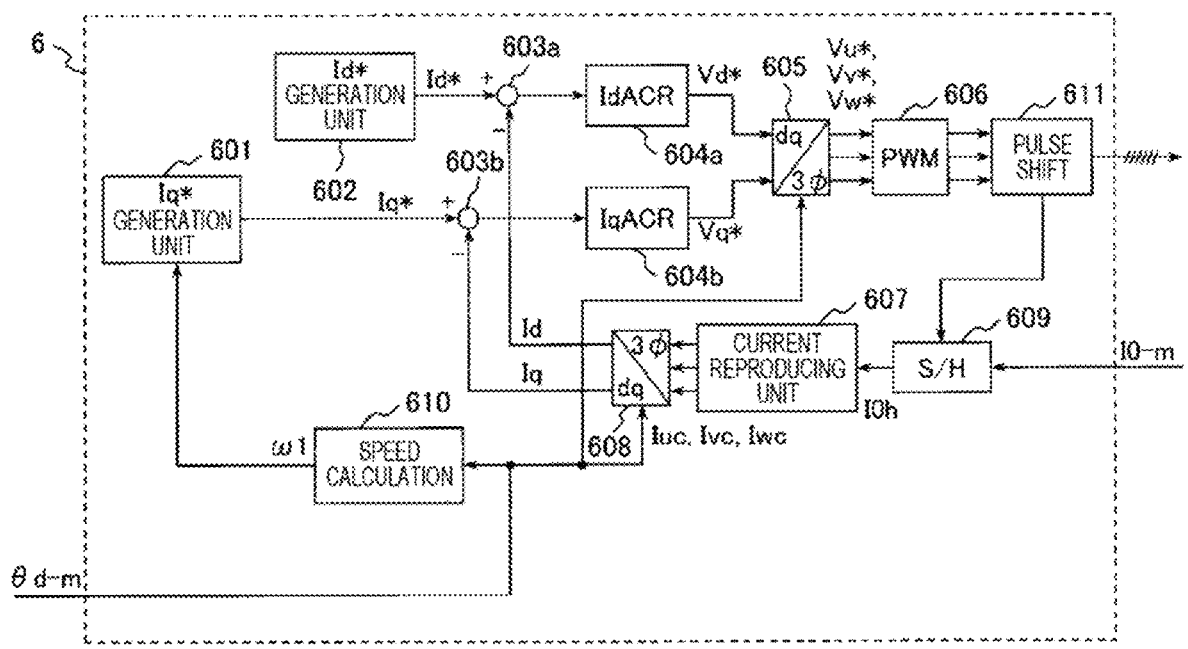
FIG. 5 is a block diagram illustrating a configuration of a control unit.

FIG. 5 is a block diagram illustrating a configuration of the control unit 6. In the control unit 6, so-called vector control is applied.

As illustrated in FIG. 5, the control unit 6 includes a q-axis current command generation unit (Iq* generation unit) 601, a d-axis current command generation unit (Id* generation unit) 602, a subtraction unit 603a, a subtraction unit 603b, and a d-axis current control unit (IdACR) 604a, a q-axis current control unit (IqACR) 604b, a dq inverse conversion unit 605, a PWM generation unit 606, a current reproduction unit 607, a dq conversion unit 608, a sample/hold unit 609, a speed calculation unit 610, and a pulse shift unit 611. With this configuration, the control unit 6 operates so that the permanent magnet synchronous motor 4 generates torque corresponding to a q-axis current command Iq*.

The Iq* generation unit 601 generates the q-axis current command Iq* corresponding to the torque of an electric motor. The Iq* generation unit 601 normally generates the q-axis current command Iq* such that the rotation speed of the permanent magnet synchronous motor 4 becomes a predetermined value while observing an actual speed ω1. The q-axis current command Iq* output from the Iq* generation unit 601 is output to the subtraction unit 603b.

The Id* generation unit 602 generates a d-axis current command Id* corresponding to the exciting current of the permanent magnet synchronous motor 4. The d-axis current command Id* output from the Id* generation unit 602 is output to the subtraction unit 603a.

The subtraction unit 603a calculates a deviation between a d-axis current command Id* output from the Id* generation unit 602 and a d-axis current Id output from the dq conversion unit 608, that is, the d-axis current Id obtained by dq conversion of the three-phase current (Iuc, Ivc, Iwc) flowing to the three-phase winding.

The subtraction unit 603b calculates a deviation between a q-axis current command Iq* output from the Iq* generation unit 601 and a q-axis current Iq output from the dq conversion unit 608, that is, the q-axis current Iq obtained by dq conversion of the three-phase current (Iuc, Ivc, Iwc) flowing to the three-phase winding.

The IdACR 604a calculates the d-axis voltage command Vd* on the dq coordinate axes so that the d-axis current deviation calculated by the subtraction unit 603a becomes zero. Further, the IqACR 604b calculates a q-axis voltage command Vq* on the dq coordinate axes so that the q-axis current deviation calculated by the subtraction unit 603b becomes zero. The d-axis voltage command Vd*, which is the output of IdACR 604a, and the q-axis voltage command Vq*, which is the output of IqACR 604b, are output to dq inverse conversion unit 605.

The dq inverse conversion unit 605 converts voltage commands Vd* and Vq* in the dq coordinate system (magnetic flux axis-magnetic flux axis orthogonal axis) into voltage commands Vu*, Vv*, and Vw* on three-phase AC coordinates. The dq inverse conversion unit 605 calculates the voltage commands Vu*, Vv*, and Vw* on the three-phase AC coordinate system based on the voltage commands Vd* and Vq* and the rotor position θd output by the rotational position estimation unit (FIG. 4). The dq inverse conversion unit 605 outputs the calculated Vu*, Vv*, and Vw* to the PWM generation unit 606.

The PWM generation unit 606 outputs a PWM (Pulse Width Modulation) signal for controlling a power conversion operation of the inverter main circuit 311. The PWM generation unit 606 is based on the three-phase AC voltage commands Vu*, Vv*, and Vw*, and compares the three-phase AC voltage command with a carrier signal (for example, a triangular wave) to generate a PWM signal (see PVu, PVv, and PVw in FIG. 1). The PWM signal output from the PWM generation unit 606 is input to the output pre-driver 313 (FIG. 4) and the sample/hold unit (S/H circuit) 609 via the pulse shift unit 611.

The current reproduction unit 607 reproduces the three-phase currents (Iuc, Ivc, Iwc) flowing through the three-phase windings from the DC bus current I0 output from the inverter main circuit 311 to the one-shunt current detector 312. The reproduced three-phase currents (Iuc, Ivc, Iwc) are output from the current reproduction unit 607 to the dq conversion unit 608.

The dq conversion unit 608 converts the three-phase currents (Iuc, Ivc, Iwc) into Id and Iq on the dq coordinate which is a rotation coordinate axis. The converted Id and Iq are used by the subtraction units 603a and 603b to calculate the deviation from the current command, respectively.

The speed calculation unit 610 calculates the rotation speed ω1 of the permanent magnet synchronous motor from the rotor position θd which is an estimation value of the rotor position. The calculated rotation speed ω1 is output to the Iq* generation unit 601, and used for current control on an axis (q axis) orthogonal to the magnetic flux axis (d axis).

In the first embodiment, the neutral point potential detection unit 1, the rotational position estimation unit 2, and the control unit 6, that is, the control system of the motor control device 3 is configured by one microcomputer. The neutral point of the three-phase winding is electrically connected to a control microcomputer by wiring or the like.

Further, each of the inverter main circuit 311 and the output pre-driver 313 may be configured by an integrated circuit device. Further, the inverter 31 may be configured by an integrated circuit device. As a result, the size of the motor control device can be significantly reduced. Further, mounting of the motor control device on various electric devices is facilitated, and various electric devices are downsized.

Next, the basic operation of the motor control device will be described.

In the first embodiment, vector control, which is generally known as control means for linearizing the torque of the synchronous electric motor, is applied.

The principle of the vector control technique is a method of independently controlling the current Iq contributing to the torque and the current Id contributing to the magnetic flux on a rotation coordinate axis (dq coordinate axes) based on the rotor position of the motor. The d-axis current control unit 604a, the q-axis current control unit 604b, the dq inverse conversion unit 605, the dq conversion unit 608, and the like in FIG. 5 are main parts for realizing this vector control technique.

In the control unit 6 of FIG. 5, the current command Iq* corresponding to the torque current is calculated by the Iq* generation unit 601 so that the current control is performed to match the current command Iq* to the actual torque current Iq of the permanent magnet synchronous motor 4.

The current command Id* is normally given as "zero" in the case of a non-salient pole type permanent magnet synchronous motor. On the other hand, in a permanent magnet synchronous motor having a salient pole structure or a field weakening control, a negative command may be given as the current command Id*.

The three-phase current of the permanent magnet synchronous motor is directly detected by a current sensor such as a CT (Current Transformer) or, as in the first embodiment, a DC bus current is detected, and the three-phase current is reproduced and calculated in the controller based on the DC bus current. In the first embodiment, the three-phase current is reproduced and calculated from the DC bus current I0. For example, in the control unit 6 illustrated in FIG. 5, the S/H unit 609 is operated at a timing corresponding to the PWM signal phase-shifted by the pulse shift unit 611, and the current value of the DC bus current I0 is sampled and held. Thus, a current value I0h of the DC bus current including information on the three-phase current is acquired. Then, the three-phase currents (Iuc, Ivc, Iwc) are reproduced and calculated by the current reproduction unit 607 from the acquired current values. Since a specific configuration for the reproduction calculation is a known technique, a detailed description is omitted.

Hereinafter, the configuration for estimating the rotor position from the neutral point potential in the first embodiment will be described.

First, the change in the neutral point potential depending on the rotor position will be described.

The output potential of each phase of the inverter 31 is set by the ON/OFF state of the upper semiconductor switching element (Sup1, Svp1, Swp1) or the lower semiconductor switching element (Sun1, Svn1, Swn1) of the inverter main circuit 311. In each of these semiconductor switching elements, if one of the upper side and the lower side is in the ON state, the other is in the OFF state. That is, in each phase, the upper and lower semiconductor switching elements are turned on/off complementarily. Therefore, the output voltage of the inverter 31 has eight switching patterns in total.

Figure 6:
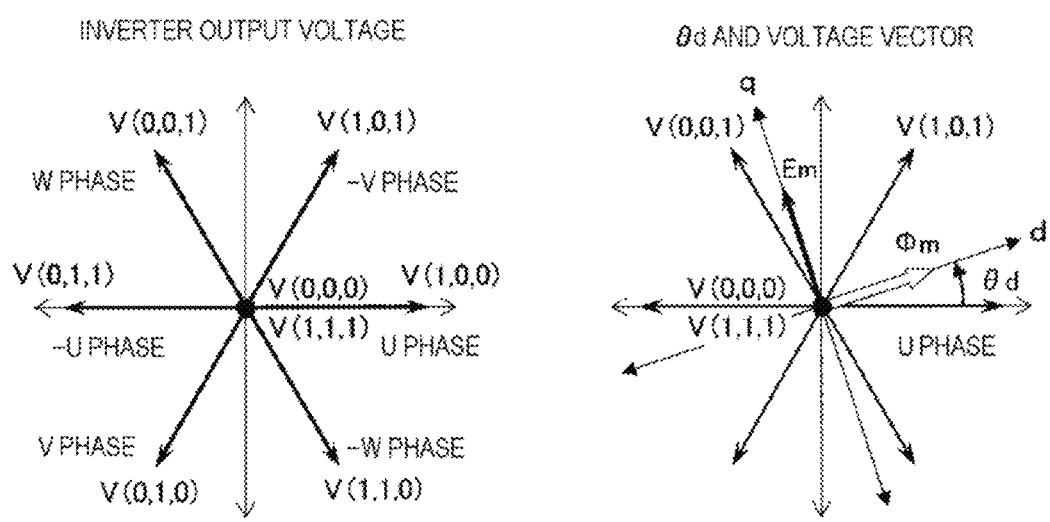
FIG. 6 is a vector diagram illustrating a switching pattern of an inverter output voltage, and a vector diagram illustrating a relation between a rotor position and a voltage vector.

FIG. 6 is a vector diagram (left diagram) illustrating the switching pattern of the inverter output voltage, and a vector diagram (right diagram) illustrating the relation between the rotor position (phase) θd and the voltage vector.

Each vector has a name such as V (1,0,0). In this vector notation, the ON state of the upper semiconductor switching element is represented by "1", and the ON state of the lower semiconductor switching element is represented by "0". The arrangement of numbers in parentheses indicates the switching state in the order of "U phase, V phase, W phase". The inverter output voltage can be represented using eight voltage vectors including two zero vectors (V (0,0,0), V (1,1,1)).

By combining these eight voltage vectors, a sinusoidal current is supplied to the permanent magnet synchronous motor 4.

As illustrated in FIG. 6 (right diagram), the rotor position (phase) θd is defined with the reference of the rotor position of the permanent magnet synchronous motor 4 as the U-phase direction. The dq coordinate axes in the rotational coordinates have the direction of the magnet magnetic flux Φm as the d-axis direction, and rotate counterclockwise. The q-axis direction is a direction orthogonal to the d-axis direction.

Here, when θd is around 0°, an induced voltage vector Em is close to the voltage vectors V (1,0,1) and V (0,0,1) because the direction is the q-axis direction. In this case, the permanent magnet synchronous motor 4 is driven mainly using the voltage vectors V (1,0,1) and V (0,0,1). Further, voltage vectors V (0,0,0) and V (1,1,1) are also used, but these are zero vectors.

Figures 7, 8:
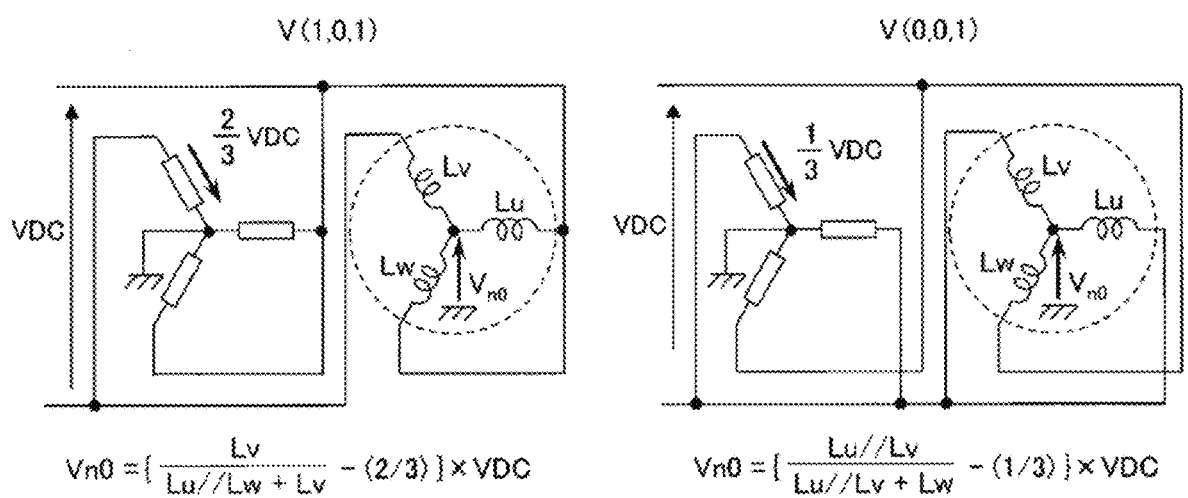
FIG. 7 illustrates definitions of names of neutral point potentials observed for each voltage vector.
FIG. 8 illustrates a relation between a permanent magnet synchronous motor in a state where a voltage vector is applied and a virtual neutral point circuit.

FIG. 7 illustrates definitions of six types of non-zero voltage vectors and names of neutral point potentials observed for each voltage vector in the first embodiment. The neutral point potential that can be detected by the voltage vector V (1,0,1) illustrated in FIG. 1 is described as VnB. Further, the neutral point potential that can be detected by the voltage vector V (0,0,1) illustrated in FIG. 1 is denoted as VnC.

FIG. 8 illustrates a relation between the permanent magnet synchronous motor 4 in a state where a voltage vector is applied and a virtual neutral point circuit composed of three resistors. Here, Lu, Lv, and Lw are the inductance of the U-phase winding, the inductance of the V-phase winding, and the inductance of the W-phase winding, respectively. The applied voltage vectors are the above-described voltage vectors V (1,0,1) (left figure) and V (0,0,1) (right figure).

A neutral point potential Vn0 illustrated in FIG. 8 can be calculated as follows.

When the voltage vector V (1,0,1) is applied, it is calculated by Expression (1).

$$Vn0 = \{Lv/(Lu//Lw+Lv) - (\tfrac{2}{3})\} \times VDC \tag{1}$$

When the voltage vector V (0,0,1) is applied, it is calculated by Expression (2).

$$Vn0 = \{(Lu//Lv)/(Lu//Lv+Lw) - (\tfrac{1}{3})\} \times VDC \tag{2}$$

Here, the notation "//" is a total inductance value of a parallel circuit of two inductances. For example, "Lu//Lw" is represented by Expression (3).

$$Lu//Lw = (Lu \cdot Lw)/(Lu+Lw) \tag{3}$$

If the magnitudes of the three-phase winding inductances Lu, Lv, and Lw are all equal, the neutral point potential Vn0 is zero from Expressions (1) and (2). However, in practice, the magnitude of the inductance is not a little different due to the influence of the permanent magnet magnetic flux distribution of the rotor. That is, the magnitudes of the inductances Lu, Lv, and Lw change depending on the position of the rotor, and the magnitudes of Lu, Lv, and Lw differ. Therefore, the magnitude of the neutral point potential Vn0 changes according to the rotor position.

FIG. 1 described above illustrates a state of pulse width modulation using a triangular wave carrier, and a state of a change in a voltage vector and a neutral point potential at that time. Here, the triangular wave carrier is a signal serving as a reference for converting the magnitude of the three-phase voltage commands Vu*, Vv*, and Vw* into a pulse width, and the magnitude relations between the triangular wave carrier and the three-phase voltage commands Vu*, Vv* and Vw* are compared to create a PWM pulse. As illustrated in FIG. 1, when the magnitude relation between each of the voltage commands Vu*, Vv*, and Vw* and the triangular wave carrier changes, the rising/falling of the PWM pulse changes. At the same time, a non-zero neutral point potential Vn0 is detected.

As illustrated in FIG. 1, the neutral point potential Vn0 hardly fluctuates except at the time of rising/falling of the PWM pulse. This indicates that the difference between the magnitudes of the three-phase winding inductances Lu, Lv, and Lw generated according to the rotor position is small. In contrast, when the PWM pulse rises/falls, that is, when voltage vectors other than the zero vector (V (1,0,1) and V (0,0,1) in FIG. 1) are applied, the rate of change of the motor current increases. Therefore, a relatively large change in the neutral point potential Vn0 is detected even if the difference in the magnitude of the inductance is small. Therefore, if the neutral point potential is observed in synchronization with the PWM pulse signals PVu, PVv, and PWw, it is possible to detect a change in the neutral point potential with high sensitivity.

Next, a configuration for estimating the rotor position from the detected neutral point potential will be described.

Since the neutral point potential Vn0 changes periodically according to the rotor position (for example, see PTL 4 described above), the relation between the rotor position and the neutral point potential Vn0 is measured or simulated in advance, and map data, table data, or a function indicating the relation between the rotor position and the neutral point potential Vn0 is obtained in advance. Using such map data, table data, or a function, the rotor position is estimated from the detected neutral point potential.

In addition, the neutral point potential detected for the two types of voltage vectors (V (1,0,1) and V (0,0,1) in FIG. 1) is regarded as a three-phase AC amount (for two phases). Then, a phase amount is calculated using coordinate transformation (three-phase two-phase transformation), and this phase amount is used as an estimation value of the rotor position. Since this configuration is based on a known technique (for example, see PTL 5 described above), detailed description will be omitted.

The rotational position estimation unit 2 (FIG. 4) estimates the rotor position θd by the above-mentioned estimation units based on the neutral point potential detection values Vn1-$d$ and Vn2-$d$ output by the neutral point potential detection unit 1. These estimation units are appropriately selected according to the desired position detection accuracy and the performance of the microcomputer for control.

Figure 3:
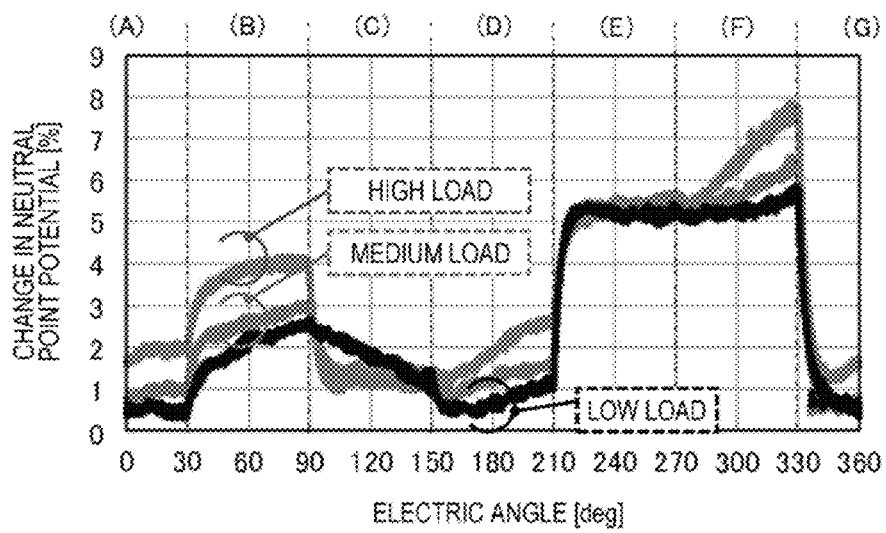
FIG. 3 illustrates a variation amount of a neutral point potential from a reference potential when load torque is changed.

By utilizing the fact that the neutral point potential changes according to the magnetic pole position of the motor, the magnetic pole position can be detected at a motor rotation speed of zero speed or low speed. However, as described above (FIG. 3), when the load is high, the change in the neutral point potential with respect to the magnetic pole position is small, and thus there is a problem that the position estimation accuracy is reduced. Further, there is the following problem relating to the position estimation accuracy.

Figure 9:
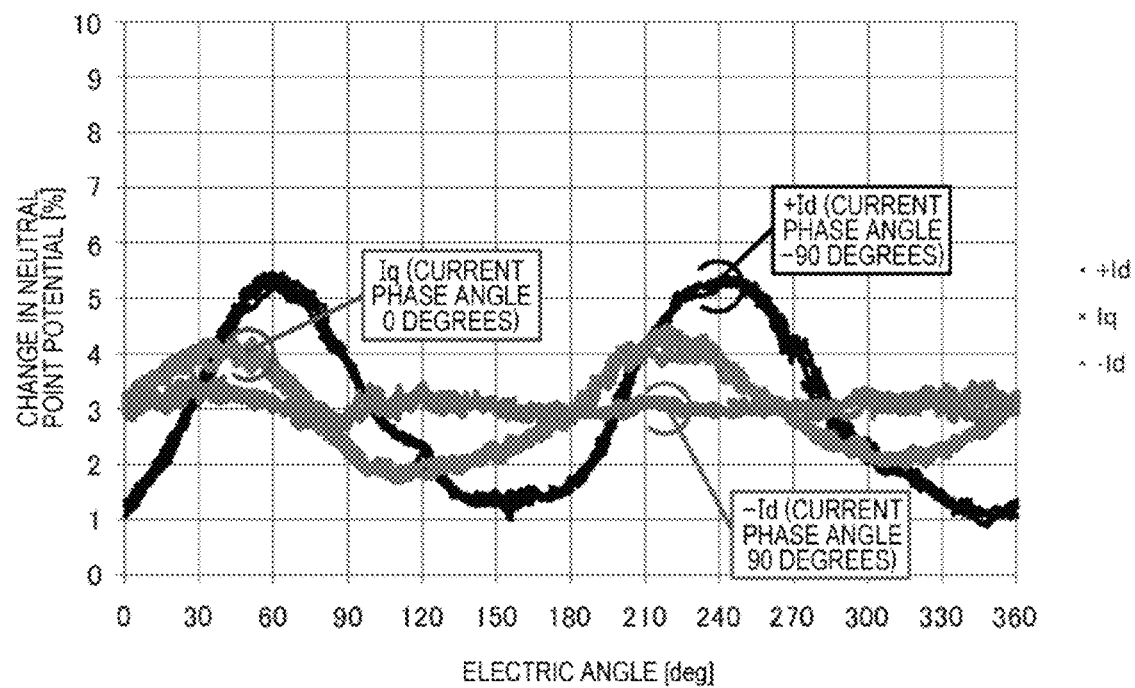
FIG. 9 illustrates a relation between a current phase and a neutral point potential when a conduction phase is changed.

FIG. 9 illustrates the relation between the current phase and the neutral point potential when a certain current passes and the conduction phase (angle from the q axis) is changed. As illustrated in FIG. 9, the manner of change of the neutral point potential (amplitude and phase of the periodic change) greatly differs depending on the current phase.

Therefore, the neutral point potential detection unit 1 and the rotational position estimation unit 2 in the first embodiment will be described.

The neutral point potential detection unit 1 detects the value of Vn0 twice with sufficient sensitivity in one carrier cycle from the waveform of the neutral point potential Vn0 (see FIG. 1). In FIG. 1, neutral point potentials Vn1-$d$ and Vn2-$d$ are detected values. Here, the neutral point potential Vn0 illustrated in FIG. 1 represents a difference between a neutral point potential Vn, which is sensed at the neutral point of the three-phase winding and input to the neutral point potential detection unit 1 (see FIG. 4), and a virtual neutral point potential generated by three resistors or the reference potential Vnc generated by dividing the output voltage of the DC power source 5.

In one carrier cycle, the neutral point potential can be detected four times with sufficient sensitivity, and the four detection values obtained at this time can be used for rotor position estimation. In the first embodiment, Vn1-$d$ and Vn2-$d$ detected in the first half of the cycle are used for rotor position estimation.

Figure 10:
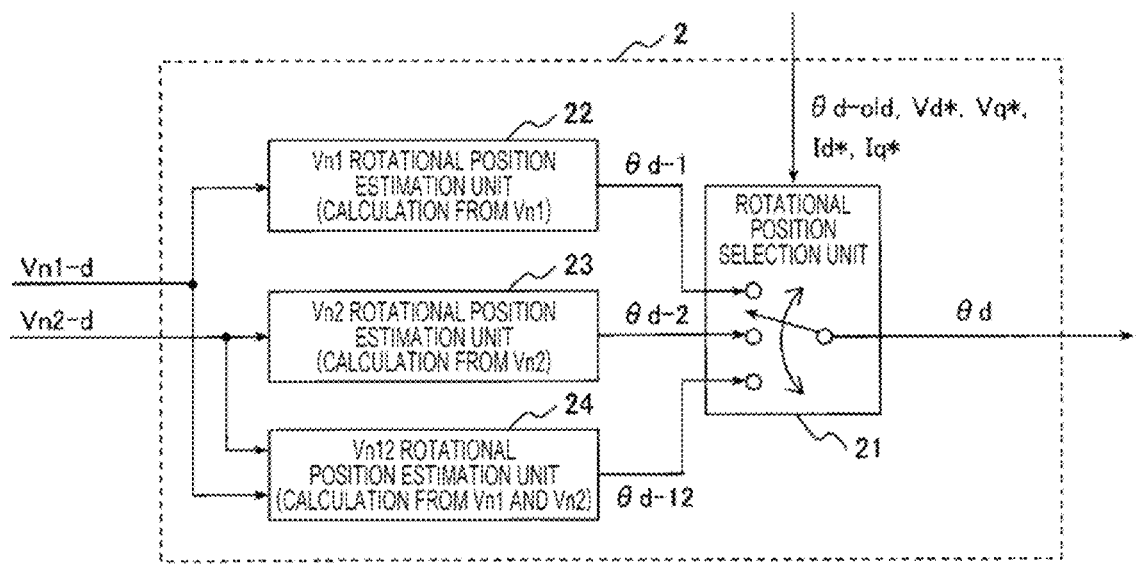
FIG. 10 is a block diagram illustrating a configuration of a rotational position estimation unit.

FIG. 10 is a block diagram illustrating a configuration of the rotational position estimation unit 2 in the first embodiment.

As illustrated in FIG. 10, the rotational position estimation unit 2 includes a Vn1 rotational position estimation unit 22 for estimating a rotor position θd-1 from Vn1-$d$, and a Vn2 rotational position estimation unit 23 for estimating a rotor position θd-2 from Vn2-$d$, a Vn12 rotational position estimation unit 24 for estimating a rotor position θd-12 from Vn1-$d$ and Vn2-$d$, and a rotational position selection unit 21 for selecting a rotor position θd to be output from estimated rotor positions θd-1, θd-2, and θd-12.

The Vn1 rotational position estimation unit 22 and the Vn2 rotational position estimation unit 23 use only one of Vn1-$d$ and Vn2-$d$, that is, use only Vn1-$d$ or only Vn2-$d$. Further, the Vn12 rotational position estimation unit 24 uses both Vn1-$d$ and Vn2-$d$.

Incidentally, in the Vn1 rotational position estimation unit 22, the Vn2 rotational position estimation unit 23, and the Vn12 rotational position estimation unit 24, as a specific configuration for calculating the rotor position from the detected value of the neutral point potential, as described above, there are a configuration for using a map indicating the relation between the neutral point potential and the magnetic pole position, and a configuration for estimating and calculating the magnetic pole position by performing coordinate transformation from the neutral point potential detected twice (see PTL 5).

The rotational position selection unit 21 outputs a rotor position estimation value to be output at the present time from among the rotational position θd-1 output from the Vn1 rotational position estimation unit 22, the rotational position θd-2 output from the Vn2 rotational position estimation unit 23, and the rotational position θd-12 output from the Vn12 rotational position estimation unit 24, based on any one or more of an estimation value θd-old of the rotor position output by the rotational position estimation unit 2 at the previous time, the d-axis voltage command Vd*, the q-axis voltage command Vq*, and the d-axis current command Id*, and the q-axis current command Iq*.

A specific example of the selection configuration will be described with reference to FIGS. 11 and 12.

Figure 11:
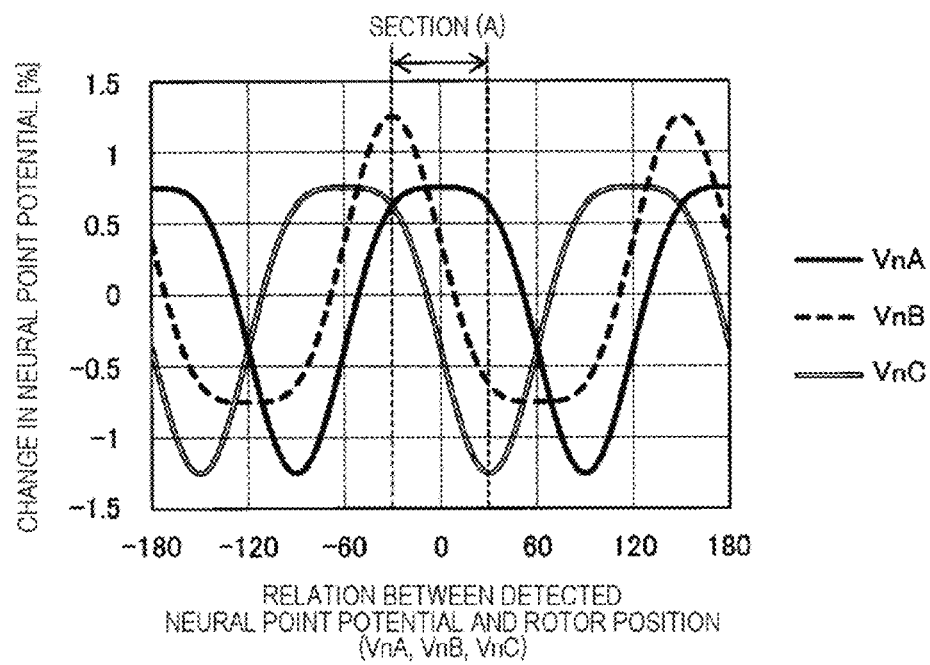
FIG. 11 illustrates an example of a relation between a neutral point potential detected when no load is applied and a rotor position.
Figure 11:
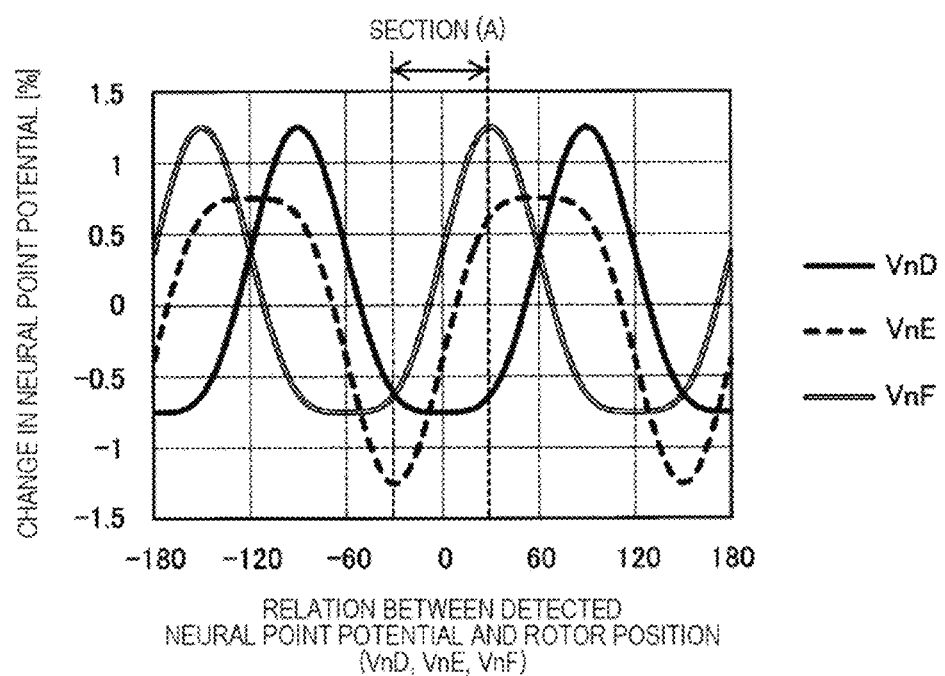

FIG. 11 illustrates an example of the relation between the neutral point potential detected when there is no load and the rotor position. The neutral point potentials (VnA to VnF: see FIG. 7) for each applied voltage vector are illustrated.

As illustrated in FIG. 11, in section (A), the change in the neutral point potential with respect to the electrical angle is large for VnB, VnC, VnE, and VnF, and the change in the neutral point potential with respect to the electrical angle is small for VnA and VnD. Here, assuming that the rotor is located in section (A), when the applied voltage vectors for detecting the neutral point potential are VnC and VnD, and the rotor position is calculated using both the neutral point potential detection values in VnC and VnD, the detected value at VnD where the change in the neutral point potential is small with respect to the electrical angle influences, and the position estimation error increases. Therefore, if the rotor position is estimated using only the neutral point potential detection value in the case of VnC, a position estimation error can be suppressed.

In section (A), in addition to VnD, VnA also has a small change in the neutral point potential with respect to the electrical angle.

Therefore, if one of the two neutral point potential detection values according to the two applied voltage vectors is VnA or VnD, estimating the rotor position using only the other detection value suppresses a position estimation error.

Further, in section (A), when two neutral point potential detection values according to the two applied voltage vectors are two of VnB, VnC, VnE, and VnF, estimating the rotor position using the two detected values reliably suppresses the position estimation error.

Based on the relation between the neutral point potential and the rotor position as illustrated in FIG. 11, the rotational position selection unit 21 (FIG. 10) selects the rotor position estimation value θd to be output as follows. That is, the rotational position selection unit 21 selects an estimation value calculated by the detected value when the change in the neutral point potential is large from among θd-1, θd-2, and θd-12 according to an approximate rotor position and a voltage application state at the time of detecting the two neutral point potential detection values Vn1-d and Vn2-d, for example, as one of the positions in section (A), and outputs the estimation value as the current θd.

The approximate rotor position can be determined by the estimation value θd-old of the rotor position output by the rotational position estimation unit 2 at the previous estimation time point. Further, θd-old is stored in a recording device such as a register in the microcomputer, and is updated each time the position is estimated.

The voltage applied to the three-phase winding of the permanent magnet synchronous motor 4 by the inverter 31 can be determined by the dq axis voltage commands Vd* and Vq*, the switching state of each semiconductor switching element, that is, the determination can be made based on the switching state of each semiconductor switching element, that is, a gate drive signal output by the output pre-driver 313, and a gate command signal (PWM signal) output by the control unit 6 in addition to the output voltage of the inverter 31 and the input voltage to the permanent magnet synchronous motor 4.

The rotational position estimation unit 2 generates map data or table data in advance indicating the relation between ed-old and the voltage application state (VnA to VnF) and the suitability of the neutral point potential detection value for estimating the rotor position in terms of estimation error. With the data, an estimation value in which the estimation error is suppressed is selected from θd-1, θd-2, and θd-12. Further, the rotational position estimation unit 2 is provided in advance with data indicating the relation between the neutral point potential and the rotor position as illustrated in FIG. 11, and based on such data, may select an estimation value calculated based on the detected value when the change in the neutral point potential is large. Further, these data can be acquired by experiments and electromagnetic field analysis.

Figure 12:
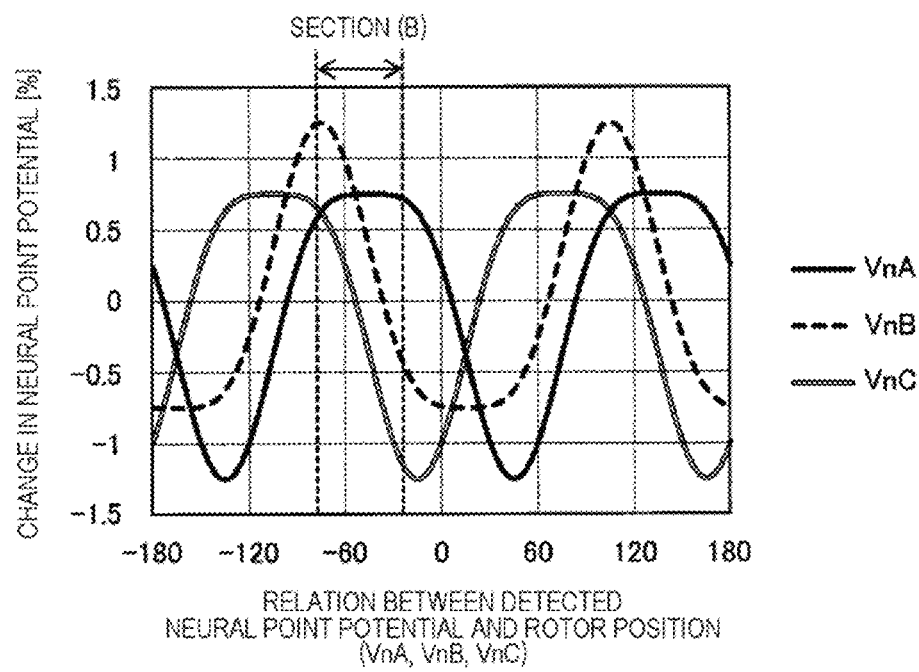
FIG. 12 illustrates an example of a relation between a neutral point potential and a rotor position when motor torque is generated.
Figure 12:
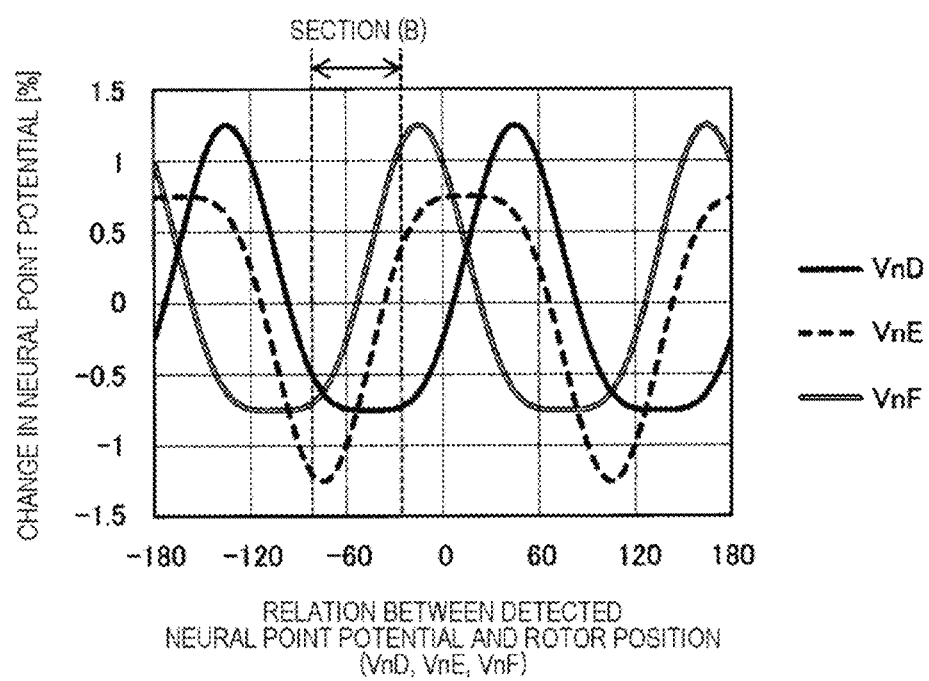

FIG. 12 illustrates an example of the relation between the neutral point potential and the rotor position when the motor torque is generated by energizing with the q-axis current. Further, similarly to FIG. 11, the neutral point potentials VnA to VnF (see FIG. 7) are illustrated.

As illustrated in FIG. 12, section (A) in FIG. 11 (the electrical angle range from −30 degrees to 30 degrees) shifts to section (B) (the electrical angle range from −75 degrees to −15 degrees).

As described above, the state of change in the neutral point potential depending on the rotor position changes according to the load. In this case, the rotational position estimation unit 2 includes a plurality of the above-described data used for selecting the estimation value with the q-axis current Iq or the q-axis current command Iq* indicating the load magnitude as a parameter.

Further, as illustrated in FIG. 9 described above, the manner of change in the neutral point potential (amplitude and phase of the periodic change) greatly differs depending on the current phase. Therefore, by applying the d-axis current, the change in the neutral point potential is increased, and the accuracy of estimating the rotor position can be improved. In this case, the rotational position estimation unit 2 includes a plurality of the above-described data used for selecting the estimation value with the d-axis current Id or the d-axis current command Iq* as a parameter in addition to the load magnitude (Iq, Iq*).

As described above, according to the first embodiment, the rotor position estimation value estimated from the detection value when the change in the neutral point potential is large is selected from among a plurality of the estimation values of the rotor estimated from a plurality of neutral point potential detection values according to the pre-estimated value of the rotor position and the voltage application state to the permanent magnet synchronous motor. Therefore, the estimation accuracy of the rotor position is improved regardless of the magnitude of the load.

Further, according to the first embodiment, since the dq-axis voltage and the dq-axis current can be used to select the rotor position estimation value, if the neutral point potential of the three-phase winding is taken into the microcomputer, highly accurate position estimation can be performed without providing any other signal wiring to the sensor or the microcomputer. Furthermore, the detection sensitivity of the rotor position can be improved without using a sensitivity amplifier. Thus, the configuration of the motor control device is simplified, and an increase in the cost of the motor control device is suppressed.

Second Embodiment

Figure 13:
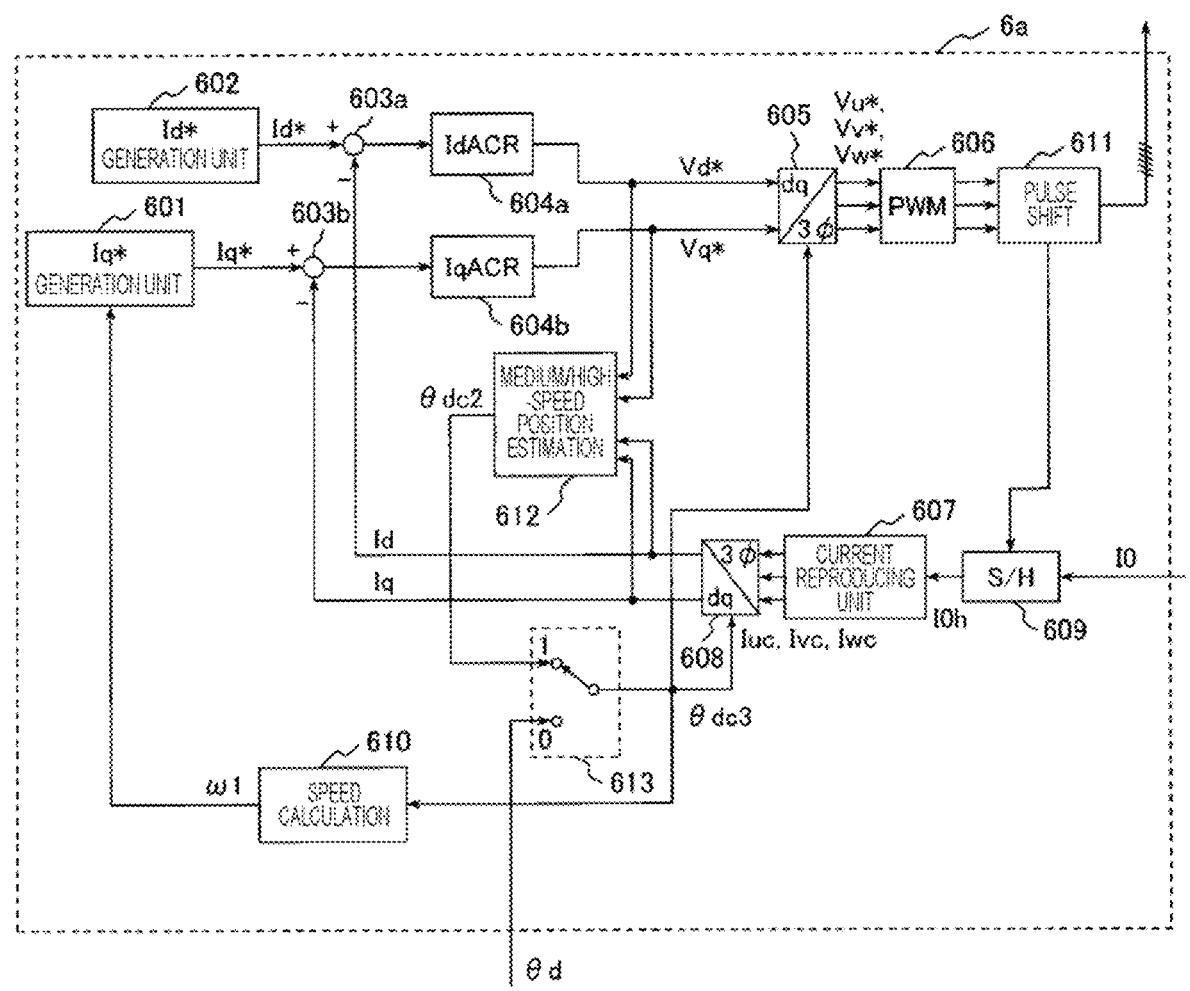
FIG. 13 is a block diagram illustrating a configuration of a control unit in the motor control device according to a second embodiment.

FIG. 13 is a block diagram illustrating a configuration of the control unit 6a in the motor control device according to the second embodiment of the invention. The configuration other than the control unit is the same as that of the first embodiment (FIG. 4). Hereinafter, points different from the control unit 6 (FIG. 5) of the first embodiment will be mainly described.

As illustrated in FIG. 13, in the second embodiment, the control unit 6a includes a medium/high-speed position estimator 612 and an estimation phase changeover switch 613 in addition to the configuration of the control unit 6 of the first embodiment (FIG. 5).

Based on the dq-axis voltage commands Vd* and Vq* and the dq-axis current detection values Id and Iq, the medium/high-speed position estimator 612 estimates and calculates the rotor position θdc2 from the constant (inductance and winding resistance) of the permanent magnet synchronous motor 4. This is a known rotor position estimation unit based on the induced voltage, and a description of a specific calculation method will be omitted. Various configurations are known as a rotor position estimation unit based on the induced voltage, and detailed description is omitted, but any configuration may be applied.

The estimation phase changeover switch 613 selects θdc2 output from the medium/high-speed position estimator 612 and the rotor position estimation value θd estimated and output by the rotational position estimation unit 2 (FIG. 4) based on the neutral point potential according to a motor speed (rotation speed), and outputs as a rotor position θdc3 used for control. That is, a position estimation algorithm of the rotor is changed according to the motor speed. For example, if the speed equal to or higher than a predetermined value is medium-high speed and the speed lower than the predetermined value is low speed, the estimation phase changeover switch 613 selects θdc2 at medium-high speed and θd at low speed. In the second embodiment, the motor speed ω1 is calculated by the speed calculation unit 610 based on θdc3.

Instead of switching between θdc2 and θd, the rotor position θdc3 may be calculated by being weighted so that θd becomes dominant in the low-speed range and θdc2 becomes dominant in the medium-high-speed range. In this case, since the control based on the neutral point potential and the control based on the induced voltage are gradually switched, the stability of the control is improved at the time of switching between the low-speed range and the high-speed range. Further, the rotation speed for switching between θd and θdc2 may have hysteresis. Thereby, hunting at the time of switching can be prevented.

In the first embodiment, θdc2 and θd are switched according to the motor speed calculated by the speed calculation unit 610, but not limited thereto, and are θdc2 and θd may be switched according to the motor speed detected by a rotational position sensor (a magnetic pole position sensor, a steering angle sensor, etc.).

As described above, according to the first embodiment, the accuracy of the rotor position used for motor control is improved in a wide speed range from a low-speed range to a medium to medium-high-speed range, so that the accuracy and stability of the speed control of the synchronous electric motor are improved, and also the reliability is improved.

Further, θdc2 may be compared with θd at the motor speed in the medium-high-speed range, and θd may be corrected in the low-speed range based on the comparison result. As a result, it is possible to reduce the influence of the individual motor differences in the three-phase inductance on the estimation error of θd in the low-speed range.

Third Embodiment

Next, a third embodiment will be described with reference to FIGS. 14 to 16.

Figure 14:
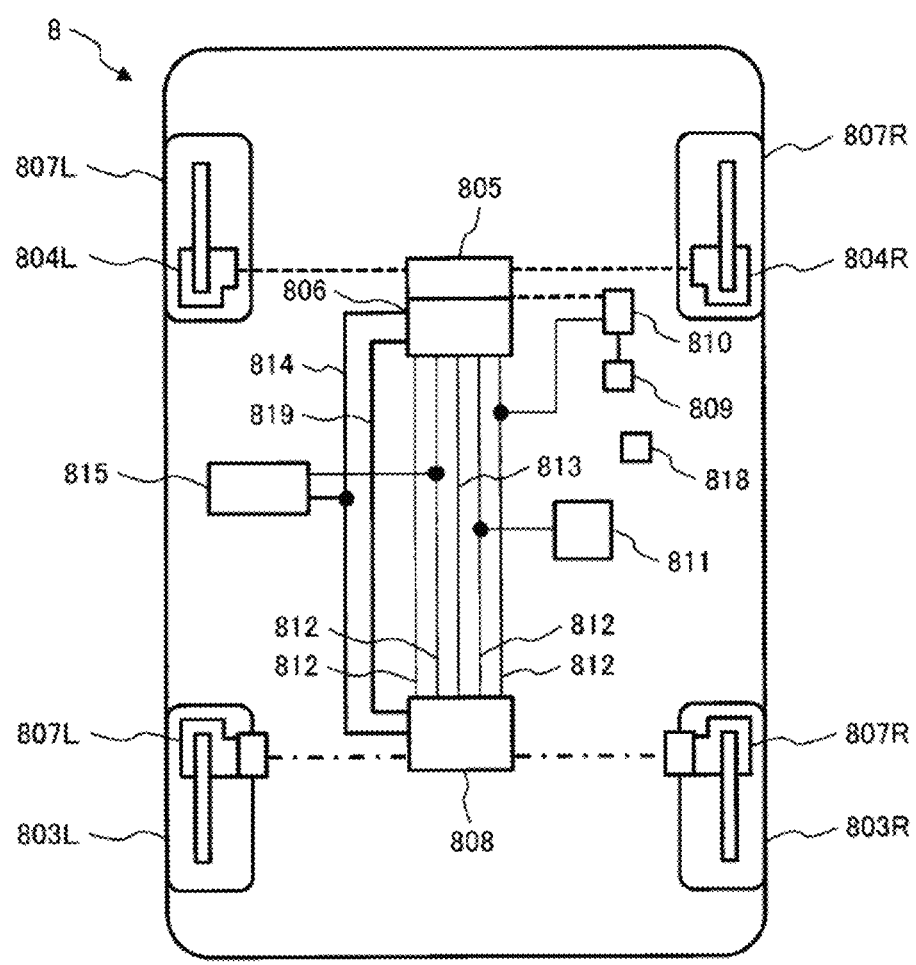
FIG. 14 is a schematic diagram illustrating a configuration of a vehicle including a brake control device according to a third embodiment.

FIG. 14 is a schematic diagram illustrating a configuration of a vehicle including a brake control device according to the third embodiment of the invention. FIG. 15 is a schematic diagram illustrating the configuration of the first braking mechanism according to the third embodiment.

Figure 16:
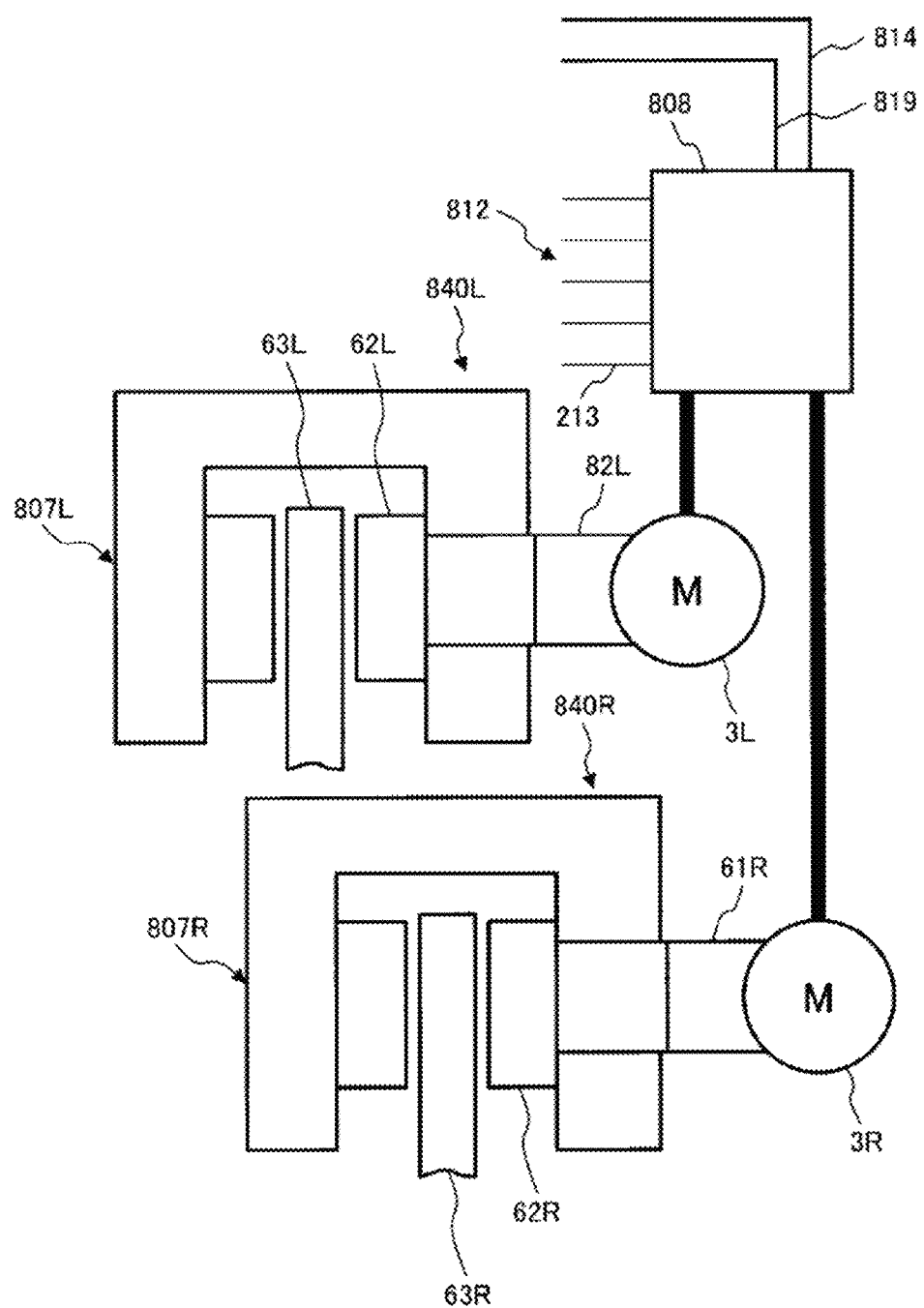
FIG. 16 is a schematic diagram illustrating a configuration of a second braking mechanism.

FIG. 16 is a schematic diagram illustrating a configuration of the second braking mechanism according to the third embodiment.

As illustrated in FIG. 14, a first wheel pair (the upper side in FIG. 14: 805L, 805R) and a second wheel pair (the lower side in FIG. 14: 803L, 803R) of a vehicle 8 are applied with a braking force by a first braking mechanism and a second braking mechanism.

The first braking mechanism is configured by hydraulic disk brakes 804L and 804R that are hydraulic brakes that operate by hydraulic pressure, a first electric mechanism 805 that generates hydraulic pressure, and a first electric mechanism control device 806 that controls the first electric mechanism 805.

Figure 15:
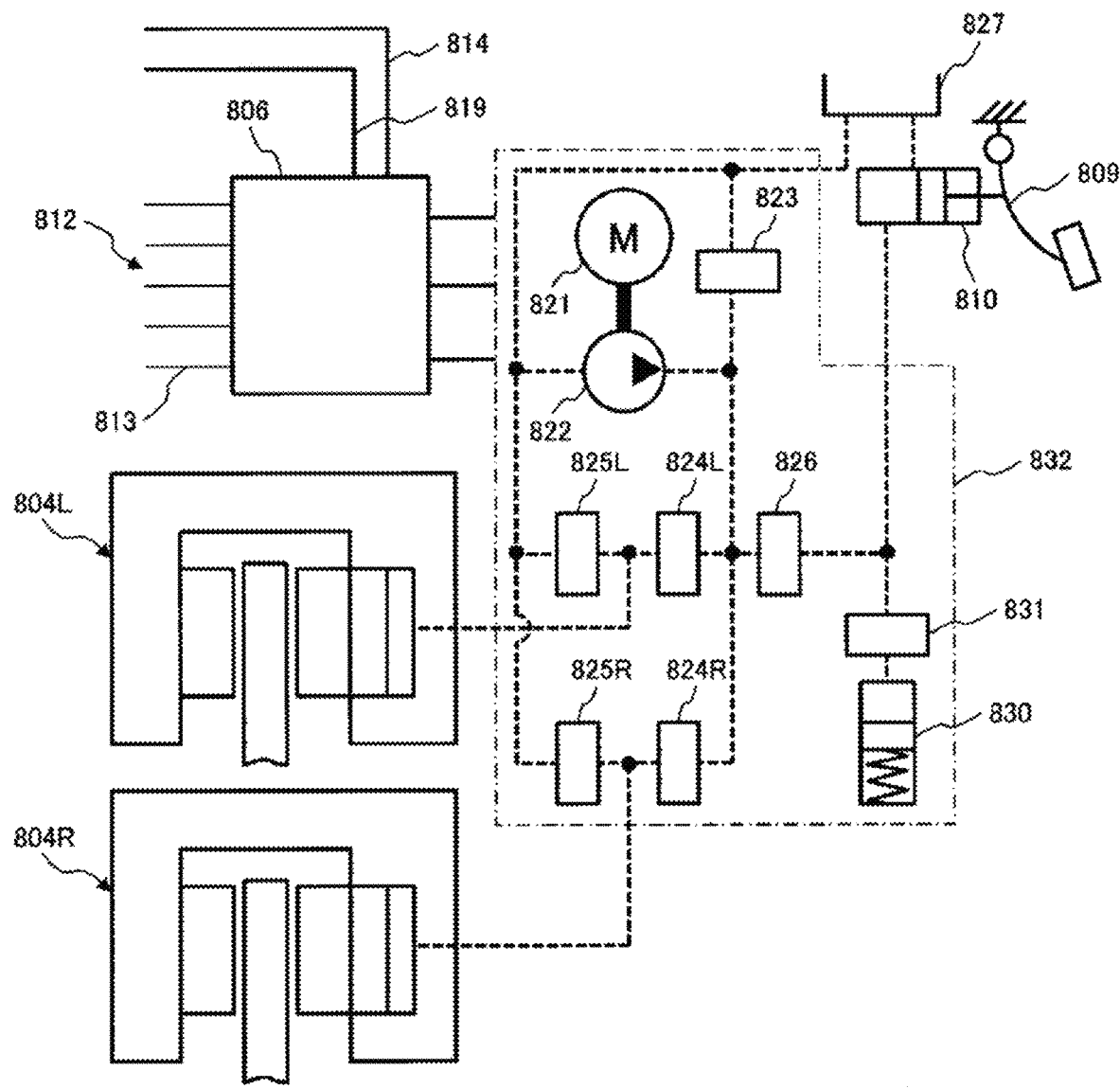
FIG. 15 is a schematic diagram illustrating a configuration of a first braking mechanism.

Here, the first electric mechanism 805 includes a hydraulic circuit 832 as illustrated in FIG. 15. The hydraulic circuit 832 is configured by a pump 822 that is operated by a permanent magnet synchronous motor 821 to pressurize the brake fluid in a reservoir tank 827, a pressure regulation valve 823 that adjusts the hydraulic pressure of the pump 822, inflow valves 824L and 824R for adjusting the hydraulic pressure flowing into the hydraulic disk brakes 804L and 804R, outflow valves 825L and 825R for adjusting the hydraulic pressure flowing out, and a shutoff valve 826 for shutting off a brake pedal 809 side.

Further, as illustrated in FIG. 15, the first braking mechanism includes, apart from the first electric mechanism 805, a master cylinder 810 that operates using a driver's operation of the brake pedal 809 as a power source. Since the master cylinder 810 is connected to the hydraulic disk brakes 804L and 804R via the hydraulic circuit 832, the hydraulic disk brakes 804L and 804R are operated by the hydraulic pressure generated by the master cylinder 810 by opening the shutoff valve 826 and the inflow valves 824L and 824R. Thereby, the vehicle 8 can be braked.

When the shutoff valve 826 is in a closed state, a stroke simulator 830 is provided to apply an appropriate reaction force to the operation of the brake pedal 809 to the driver and to absorb the brake fluid discharged from the master cylinder 810. Further, a stroke simulator valve 831 for adjusting the inflow and outflow of the brake fluid to and from the stroke simulator 830 is provided in the hydraulic path from the master cylinder 810 to the stroke simulator 830.

The first electric mechanism control device 806 controls the operation of the permanent magnet synchronous motor 821 and each valve in the first braking mechanism.

As illustrated in the lower part of FIG. 14, the second braking mechanism includes electric disk brakes 807L and 807R, and a second electric mechanism control device 808 that controls these.

As illustrated in FIG. 16, the electric disk brakes 807L and 807R have the same structure, and are operated by second electric mechanisms 840L and 840R. The second electric mechanisms 840L and 840R are configured by permanent magnet synchronous motors 3L and 3R and rotational linear-motion mechanisms 82L and 61R which decelerate and convert a rotational force of the permanent magnet synchronous motors 3L and 3R in order to bring the brake pads 62L and 62R into contact with the brake disks 63L and 63R to generate a pressing force and generate a braking force.

The second electric mechanism control device 808 controls the pressing force of the electric disk brakes 807L and 807R.

As illustrated in FIG. 14, the vehicle 8 includes a host control device 811 which calculates an appropriate operation of the vehicle 8 based on sensor information from a camera and a radar detecting an outside situation, map information, an operation state of a drive system, a steering system, and a brake system of the vehicle 8, and the operation state of the vehicle 8, and transmits a control command to the brake control device. The operation information of the brake pedal 809 (brake pedal stroke, master cylinder pressure) and the control command value of the host control device 811 are transmitted to the first electric mechanism control device 806 and the second electric mechanism control device 808 via a signal line 812. The first electric mechanism control device 806 and the second electric mechanism control device 808 communicate with each other via a communication line 813.

The first and second braking mechanisms are connected to a main power source 815 via a power source line 814, and are normally driven by power supplied from a main power source 815.

In such a brake control device mounted on the vehicle 8, when the main power source 815 is normal, the operations of the first electric mechanism and the second electric mechanism are controlled by the first electric mechanism control device 806 and the second electric mechanism control device 808 based on the operation of the brake pedal 809 of the driver, a command of the host control device 811, and a state quantity of the vehicle.

In the first braking mechanism, the shutoff valve 826 is normally closed to disconnect the master cylinder 810 from the hydraulic disk brakes 804L and 804R, and the stroke simulator valve 831 is opened to absorb the brake fluid which is discharged by the driver's operation on the brake pedal 809. At the same time, a control amount corresponding to the braking force generated on each wheel is calculated based on the operation of the brake pedal 809 or the command of the host control device 811 and the operation state of the electric disk brakes 807L and 807R. The permanent magnet synchronous motor 821 and The operations of the pressure regulation valve 823, the inflow valves 824L and 824R, and the outflow valves 825L and 825R are controlled, and the hydraulic disk brakes 804L and 804R operate.

In the third embodiment, the motor control device according to any one of the first and second embodiments described above is applied to the permanent magnet synchronous motor 821 and the first electric mechanism control device 806 for controlling the driving thereof. The motor control device according to any one of the first and second embodiments is also applied to the permanent magnet synchronous motors 3L and 3R and the second electric mechanism control device 808 that controls the driving thereof.

That is, in the third embodiment, the estimation accuracy of the rotor position is improved regardless of the magnitude of the load, so that the control accuracy of the brake control device frequently used in the low-speed range at zero speed and 10% or less of the rated speed is improved. As a result, it is possible to reliably and highly accurately boost the brake depression force or to secure the braking force with high accuracy. Therefore, the reliability of the brake control device is improved. Further, although the brake control device is used under high temperature conditions, according to the third embodiment, the brake control device can be operated in a sensor-less manner with high accuracy without using a rotational position sensor having heat resistance. Therefore, the reliability of the brake control device is improved and the cost can be reduced.

Although not illustrated, a hydraulic sensor is provided near the hydraulic disk brake (804L, 804R) in FIG. 15, and the rotor position (magnetic pole position) of the permanent magnet synchronous motor is estimated based on the hydraulic pressure to the hydraulic disk brake detected by the hydraulic sensor, and the rotor position estimated from the neutral point potential may be corrected based on the estimated rotor position. As a result, it is possible to reduce the influence of the individual motor differences in the three-phase inductance on the estimation error of the rotor position in the low-speed range using the neutral point potential.

Although not illustrated, a thrust sensor is provided near the brake pads (62L, 62R) in FIG. 16, and the rotor position of the permanent magnet synchronous motor is estimated based on the pressing force on the brake disk detected by the thrust sensor. The rotor position estimated from the neutral point potential may be corrected based on the estimated magnetic pole position. As a result, it is possible to reduce the influence of the individual motor differences in the three-phase inductance on the estimation error of the rotor position in the low-speed range using the neutral point potential.

Fourth Embodiment

Figure 2:
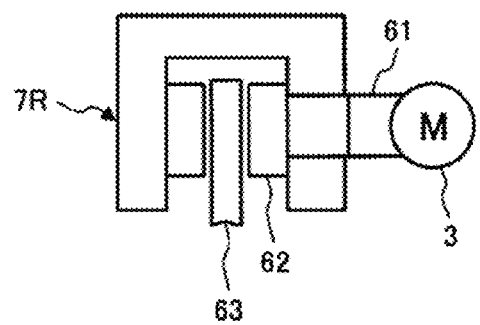
FIG. 2 illustrates a schematic configuration and an operation pattern of a brake control device.
Figure 2:
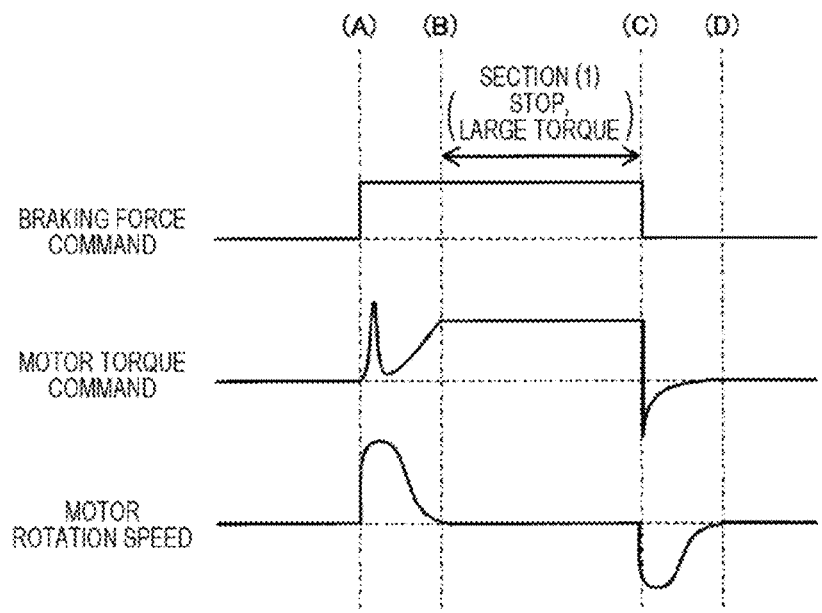

Next, a brake control device according to a fourth embodiment of the invention will be described. The configuration of the fourth embodiment is the same as that of the second braking mechanism including an electric disk brake illustrated in FIG. 16. The operation pattern of the brake control device is the same as the operation pattern illustrated in FIG. 2.

In the fourth embodiment, the second electric mechanism control device 808 (FIG. 16) drives the permanent magnet synchronous motor based on the rotor position estimated from the neutral point potential in response to a braking force command from the host control device 811 (FIG. 14). As a result, a braking force is generated by the electric disk brake.

As described above with reference to FIG. 2, the brake control device has a relatively long time range in which the braking force is kept constant, that is, the time range in which the rotation speed is zero or low but the torque is generated. Also in the third embodiment, the motor control device controls the permanent magnet synchronous motor in a clearance area where the brake pad and the brake disk are in contact (section (1) from time (B) to (C) in FIG. 2) so that the torque is generated at zero speed or at low speed.

The braking force of the brake control device depends on a force pressing the brake pad 62 against the brake disk 63, that is, the pressing force. This pressing force is given by the torque of the permanent magnet synchronous motor via the rotational linear-motion mechanism. The torque generated by the permanent magnet synchronous motor depends on the accuracy of estimating the magnetic pole position of the rotor.

Therefore, in the fourth embodiment, a positive d-axis current is applied only in the clearance area, the change in the neutral point potential with respect to the motor electrical angle is increased, and the position estimation accuracy is improved. Thereby, the control accuracy of the pressing force is improved. Accordingly, the control accuracy of the braking force by the brake control device is improved, so that the kinetic performance of the vehicle can be improved. The same applies to the aforementioned hydraulic disk brake as illustrated in FIG. 15.

Fifth Embodiment

In a fifth embodiment, the rotor position estimation based on the neutral point potential as described above and the rotational position detection by a rotational position detector (for example, a Hall IC, a resolver, an encoder, and a GMR sensor) are used together. Normally, motor control is performed based on the rotor position sensed by the rotational position detector. Further, the abnormality of the rotational position detector is determined based on the estimated rotational position based on the neutral point potential. If the rotational position detector is determined as abnormal, motor control is executed based on the rotational position based on the neutral point potential. Accordingly, even if a failure such as a failure or a signal abnormality occurs in the rotational position detector, motor control can be continued based on the estimated rotor position, so that the reliability of the motor control device is improved.

Hereinafter, the fifth embodiment will be described with reference to FIGS. 17 and 18. Further, points different from the first embodiment will be mainly described.

Figure 17:
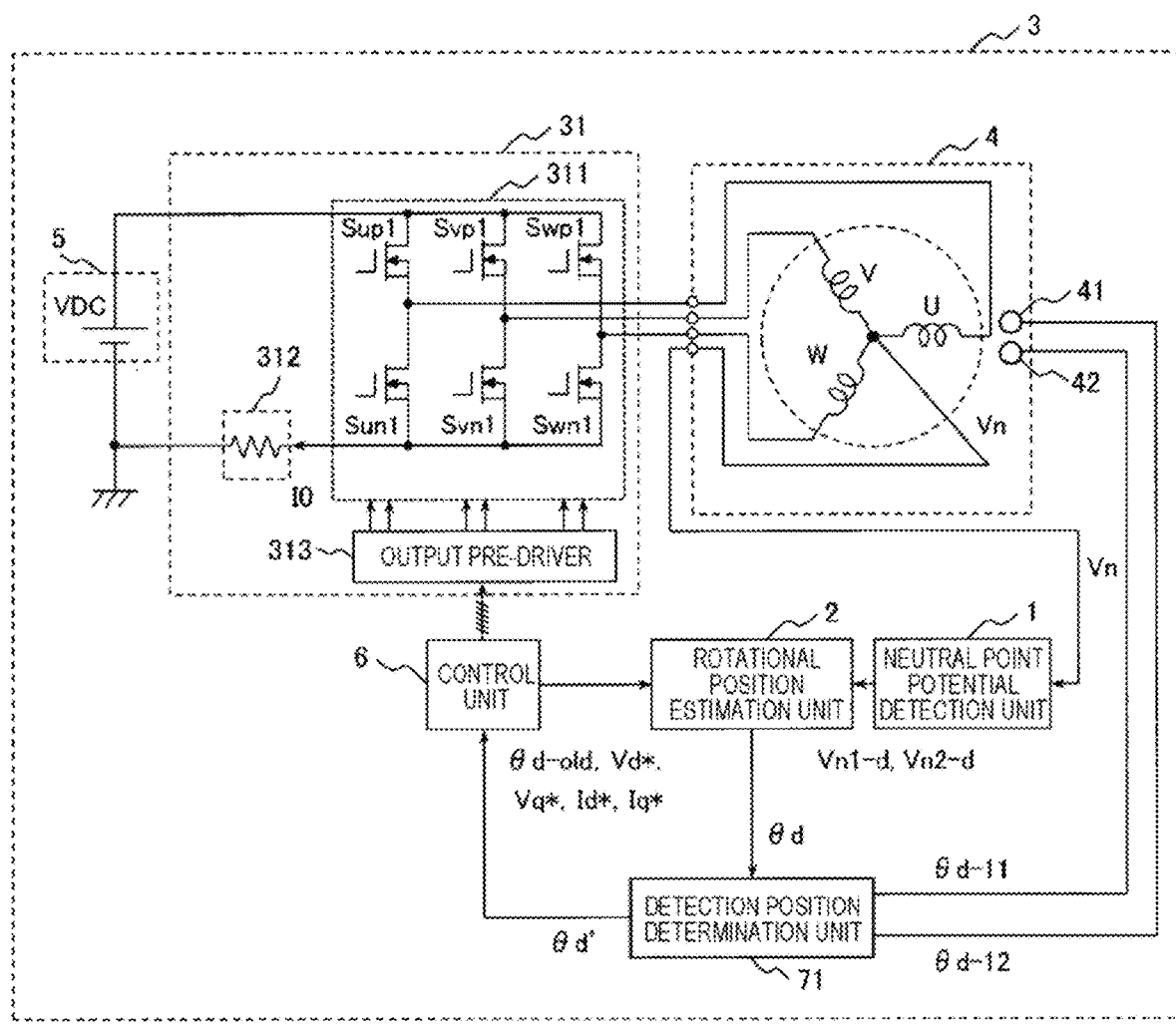
FIG. 17 is a block diagram illustrating a configuration of a motor control device according to a fifth embodiment.

FIG. 17 is a block diagram illustrating a configuration of a motor control device that is the fifth embodiment of the invention.

As illustrated in FIG. 17, rotational position detectors 41 and 42 are provided in addition to the configuration of the first embodiment (FIG. 4). In the fifth embodiment, by providing a plurality of rotational position detectors redundantly, the reliability of rotational position detection by the rotational detector is improved.

Further, there is provided a detection position determination unit 71 which determines a correct rotor position in the rotor positions θd-11 and θd-12 sensed by the rotational position detectors 41 and 42 and the rotor position θd estimated by the rotational position estimation unit 2, and outputs the determined position to the control unit 6 as the detected rotor position θd'.

Figure 18:
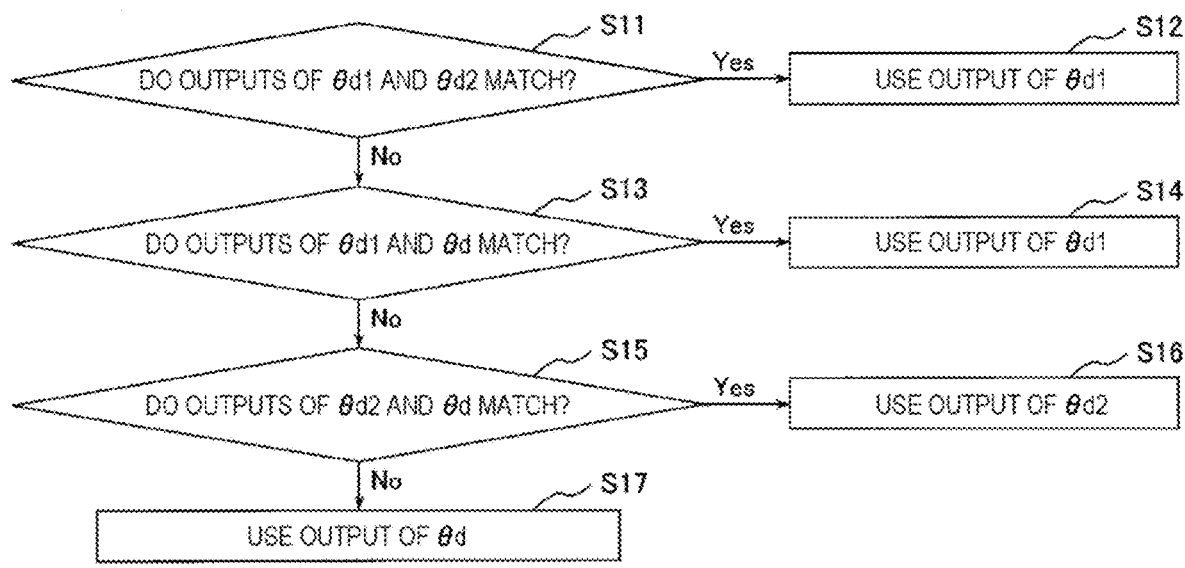
FIG. 18 is a flowchart illustrating a determination process executed by a detection position determination unit.

FIG. 18 is a flowchart illustrating the determination process executed by the detection position determination unit 71.

First, in Step S11, the detection position determination unit 71 determines whether the rotor position θd1 output from the rotational position detector 41 and the rotor position θd2 output from the rotational position detector 42 substantially match. For example, when the magnitude of the difference between θd1 and θd2 is equal to or smaller than a preset value, it is determined that they substantially match. When θd1 and θd2 substantially match (Yes in Step S11), the process proceeds to Step S12, and when θd1 and θd2 do not match, the process proceeds to Step S13 (No in Step S11).

In Step S12, the detection position determination unit outputs θd1 to the control unit 6 as a correct rotor position θd'. That is, θd' is used for motor control in the control unit 6. In this Step S12, the detection position determination unit 71 may output θd2 as θd' instead of θd1.

Here, when θd1 and θd2 do not match, it can be determined that one of the rotational position detector 41 and the rotational position detector 42 is abnormal. Therefore, in Steps S13 and S14, it is determined whether which rotational position detector is abnormal in the rotational position detectors 41 and 42 using the estimated rotor position θd output by the rotational position estimation unit 2.

In Step S13, the detection position determination unit determines whether θd1 and θd substantially match. For example, when the magnitude of the difference between θd1 and θd is equal to or smaller than a preset value, it is determined that they substantially match. When θd1 and θd substantially match (Yes in Step S13), the rotational position detector 41 is determined as normal, and the process proceeds to Step S14. When θd1 and θd do not match, the rotational position detector 41 is determined as abnormal, and the process proceeds to Step S15 (No in Step S13).

In Step S14, the detection position determination unit outputs θd1 to the control unit 6 as a correct rotor position θd'. That is, in the control unit 6, θd1 is used for motor control.

In Step S15, the detection position determination unit determines whether θd2 and θd substantially match. For example, when the magnitude of the difference between θd2 and θd is equal to or smaller than a preset value, it is determined that they substantially match. When θd2 and θd substantially match (Yes in Step S15), the rotational position detector 42 is determined as normal, and the process proceeds to Step S16. When θd2 and θd do not match, the rotational position detector 42 is determined as abnormal (No in Step S15), and the process proceeds to Step S17.

In Step S16, the detection position determination unit outputs θd2 to the control unit 6 as a correct rotor position θd'. That is, in the control unit 6, θd2 is used for motor control.

In Step S17, since both the rotational position detectors 41 and 42 are determined as abnormal in Steps S13 and S14, the detection position determination unit 71 outputs θd to the control unit 6 as a correct rotor position θd'. That is, in the control unit 6, θd is used for motor control.

It is preferable that the positions θd1, θd2, and θd be positions at the same timing. For example, three positions can be compared at the same timing by correcting the detection timing of the rotational position detector or correcting each position data by interpolation or the like. Thereby, the accuracy of determining the abnormality of the rotational position detector is improved.

As described above, according to the fifth embodiment, it is possible to determine which of a plurality of redundantly provided rotational position detectors is abnormal based on the estimated rotational position. As a result, even if one of the plurality of rotational position detectors is abnormal, the motor control is performed in the same manner as in the normal state (when there is no failure) by selecting a normal rotational position detector. Thus, desired motor torque can be continuously output. Further, even when a plurality of rotational position detectors are both abnormal, the motor control can be performed using the estimated rotor position, so that the motor drive can be maintained.

The rotational position estimation unit in the fifth embodiment is a function of the microcomputer of the control system, and can be realized without adding hardware such as a rotational position detector. Therefore, according to the fourth embodiment, the reliability of the motor control device can be improved without increasing the cost of the motor control device.

Further, the invention is not limited to the above-described embodiments, but various modifications may be contained. For example, the above-described embodiments of the invention have been described in detail in a clearly understandable way, and are not necessarily limited to those having all the described configurations. In addition, some of the configurations of each embodiment may be omitted, replaced with other configurations, and added to other configurations.

For example, the invention may be applied not only to a permanent magnet synchronous motor but also to a three-phase synchronous motor such as a winding field type synchronous motor.

In the third embodiment, the motor control device of the fifth embodiment may be applied.

REFERENCE SIGNS LIST 1 neutral point potential detection unit
2 rotational position estimation unit
3 motor control device
3L, 3R permanent magnet synchronous motor
4 permanent magnet synchronous motor
5 DC power source
6, 6a control unit
7R caliper
21 rotational position selection unit
22 Vn1 rotational position estimation unit
23 Vn2 rotational position estimation unit
24 Vn12 rotational position estimation unit
31 inverter
41, 42 rotational position detector
61, 61R rotational linear-motion mechanism
62, 62L, 62R brake pad
63, 63L, 63R brake disk
71 detection position determination unit
82L rotational linear-motion mechanism
311 inverter main circuit
312 one-shunt current detector
313 output pre-driver
601 Iq* generation unit
602 Id* generation unit
603a, 603b subtraction unit
604a d-axis current control unit
604b q-axis current control unit
605 dq inverse conversion unit
606 PWM generation unit
607 current reproduction unit
608 dq conversion unit
609 sample/hold unit
610 speed calculation unit
611 pulse shift unit
612 medium/high-speed position estimator
613 estimation phase changeover switch
803L, 803R second wheel pair
804L, 804R hydraulic disk brake
805 first electric mechanism
805L, 805R first wheel pair
806 first electric mechanism control device
807L, 807R electric disk brake
808 second electric mechanism control device
809 brake pedal
810 master cylinder
811 host control device
812 signal line
813 communication line
814 power source line
815 main power source
821 permanent magnet synchronous motor
822 pump
823 pressure regulation valve
824L, 824R inflow valve
825L, 825R outflow valve
826 shutoff valve
830 stroke simulator
831 stroke simulator valve
832 hydraulic circuit
840L, 840R second electric mechanism

The invention claimed is:

1. A motor control device, comprising:
a three-phase synchronous motor that includes a three-phase winding;
an inverter that is connected to the three-phase winding;
a control unit that controls the inverter based on a rotor position of the three-phase synchronous motor; and
a rotational position estimation unit that estimates the rotor position based on a neutral point potential of the three-phase winding, wherein
the rotational position estimation unit estimates the rotor position selectively using one or more of a plurality of detected values of the neutral point potential according to a pre-estimated value of the rotor position and a voltage application state to the three-phase winding,
the plurality of detected values of the neutral point potential are obtained in a plurality of the voltage application states, and
the rotational position estimation unit estimates the rotor position using a detected value in a voltage application state in which the neutral point potential changes more with respect to the rotor position near the pre-estimated value among the plurality of voltage application states.

2. The motor control device according to claim 1, wherein the rotational position estimation unit includes
a plurality of estimation units that estimate the rotor position using one or more of a plurality of detected values of the neutral point potential, and
a selection unit that selects one estimation value among a plurality of estimation values by the plurality of estimation units, according to the pre-estimated value of the rotor position and the voltage application state to the three-phase winding, and
the rotational position estimation unit outputs the one estimation value selected by the selection unit as the rotor position used in the control unit.

3. The motor control device according to claim 1, wherein a q-axis current is supplied to the three-phase winding.

4. The motor control device according to claim 1, wherein a d-axis current is supplied to the three-phase winding.

5. The motor control device according to claim 1, wherein the rotational position estimation unit selectively uses one or more of the plurality of detected values of the neutral point potential based on data indicating a relation between the pre-estimated value, the voltage application state, and the neutral point potential.

6. The motor control device according to claim 1, wherein, when a rotation speed of the three-phase synchronous motor is lower than a predetermined value, the control unit controls the inverter based on the rotor position estimated by the rotational position estimation unit.

7. The motor control device according to claim 6, further comprising a position estimation unit that estimates the rotor position based on an induced voltage and current of the three-phase winding,
wherein the control unit controls the inverter based on the rotor position estimated by the position estimation unit when a rotation speed of the three-phase synchronous motor is equal to or higher than the predetermined value.

8. The motor control device according to claim 7, wherein the predetermined value has a different value at a time of accelerating and at a time of decelerating.

9. The motor control device according to claim 7, wherein the rotor position estimated by the rotational position estimation unit is compared with the rotor position estimated by the position estimating unit, and the rotor position estimated by the rotational position estimation unit is corrected based on a comparison result.

10. A brake control device, comprising:
a brake; and
a motor control device that drives the brake,
wherein the motor control device includes
a three-phase synchronous motor that includes a three-phase winding,
an inverter that is connected to the three-phase winding,
a control unit that controls the inverter based on a rotor position of the three-phase synchronous motor, and
a rotational position estimation unit that estimates the rotor position based on a neutral point potential of the three-phase winding, and
the rotational position estimation unit estimates the rotor position selectively using one or more of a plurality of detected values of the neutral point potential according to a pre-estimated value of the rotor position and a voltage application state to the three-phase winding, wherein
the plurality of detected values of the neutral point potential are obtained in a plurality of the voltage application states, and
the rotational position estimation unit estimates the rotor position using a detected value in a voltage application state in which the neutral point potential changes more with respect to the rotor position near the pre-estimated value among the plurality of voltage application states.

11. The brake control device according to claim 10, wherein
the brake is a hydraulic brake, and
the rotor position estimated by the rotational position estimation unit is corrected based on a hydraulic pressure detected by a hydraulic sensor provided on the brake.

12. The brake control device according to claim 10, wherein
the brake is an electric disk brake, and
the rotor position estimated by the rotational position estimation unit is corrected based on a pressing force detected by a thrust sensor provided on the brake.

13. The brake control device according to claim 10, wherein a d-axis current is supplied to the three-phase winding in a time region in which a braking force is kept constant.

14. A motor control device, comprising:
a three-phase synchronous motor that includes a three-phase winding;
an inverter that is connected to the three-phase winding; and
a control unit that controls the inverter based on a rotor position of the three-phase synchronous motor,
wherein the control unit controls the inverter based on the rotor position sensed by a rotational position detector,
the motor control device, further comprising:
a rotational position estimation unit that estimates the rotor position based on a neutral point potential of the three-phase winding; and
a determination unit that determines abnormality of the rotational position detector based on the rotor position estimated by the rotational position estimation unit, wherein
the rotational position estimation unit estimates the rotor position selectively using one or more of a plurality of detected values of the neutral point potential according to a pre-estimated value of the rotor position and a voltage application state to the three-phase winding,
the plurality of detected values of the neutral point potential are obtained in a plurality of the voltage application states, and
the rotational position estimation unit estimates the rotor position using a detected value in a voltage application state in which the neutral point potential changes more with respect to the rotor position near the pre-estimated value among the plurality of voltage application states.

15. The motor control device according to claim 14, wherein, when the determination unit determines that the rotational position detector is abnormal, the control unit controls the inverter based on the rotor position estimated by the rotational position estimation unit.

* * * * *